United States Patent
Cline et al.

(10) Patent No.: US 7,969,985 B1
(45) Date of Patent: Jun. 28, 2011

(54) METHOD AND SYSTEM FOR SCHEDULING, TRANSPORTING, AND RECEIVING INBOUND PACKETS EFFICIENTLY IN NETWORKS WITH CYCLIC PACKET SCHEDULING

(75) Inventors: David Cline, Santa Barbara, CA (US); Judy Anne Mitchell, Goleta, CA (US); Robert Pearce, Bristol (GB)

(73) Assignee: Motion Engineering, Inc., Santa Barbara, CA (US)

( * ) Notice: Subject to any disclaimer, the term of this patent is extended or adjusted under 35 U.S.C. 154(b) by 241 days.

(21) Appl. No.: 12/203,293

(22) Filed: Sep. 3, 2008

(51) Int. Cl.
*H04L 12/28* (2006.01)
(52) U.S. Cl. .................................. 370/394; 370/428
(58) Field of Classification Search .................. None
See application file for complete search history.

(56) References Cited

U.S. PATENT DOCUMENTS

| | | | |
|---|---|---|---|
| 4,933,933 A | 6/1990 | Daily et al. | |
| 5,307,345 A | 4/1994 | Lozowick et al. | |
| 5,633,876 A | 5/1997 | Dinkins | |
| 6,094,434 A | 7/2000 | Kotzur et al. | |
| 6,144,668 A | 11/2000 | Bass et al. | |
| 6,356,558 B1 | 3/2002 | Hauck et al. | |
| 6,542,511 B1 * | 4/2003 | Livermore et al. | 370/406 |
| 7,024,257 B2 | 4/2006 | Pearce et al. | |
| 7,143,301 B2 | 11/2006 | Pearce et al. | |
| 2001/0025301 A1 * | 9/2001 | Anderson | 709/207 |
| 2001/0047424 A1 * | 11/2001 | Alastalo et al. | 709/236 |
| 2002/0107953 A1 * | 8/2002 | Ontiveros et al. | 709/224 |
| 2002/0136231 A1 * | 9/2002 | Leatherbury et al. | 370/442 |
| 2006/0280120 A1 * | 12/2006 | Ramamurti et al. | 370/235 |
| 2007/0183331 A1 * | 8/2007 | Coteus et al. | 370/235 |
| 2007/0253340 A1 * | 11/2007 | Varney et al. | 370/252 |

* cited by examiner

*Primary Examiner* — Chirag G Shah
*Assistant Examiner* — Otis L Thompson, Jr.
(74) *Attorney, Agent, or Firm* — Christine Q. McLeod; Beusse Wolter Sanks Mora & Maire, P.A.

(57) ABSTRACT

An improved system, method, and computer-readable instructions for scheduling, transporting, and receiving inbound packets efficiently in networks with cyclic packet scheduling is provided. The method provides for scheduling upstream packet transmission slots for each node in the network so that the spacing between the packet transmission slots is reduced; for each node in the network, if there is a locally originated packet of the node to be transmitted upstream, selectively activating a forwarding buffer to receive and temporarily store a packet received from a neighboring downstream node during upstream transmission of a locally originated packet of the node; and upon completion of the upstream transmission of the locally originated packet, transmitting upstream the packet stored in the forwarding buffer.

43 Claims, 21 Drawing Sheets

METHOD AND SYSTEM FOR SCHEDULING, TRANSPORTING, AND RECEIVING INBOUND PACKETS EFFICIENTLY IN NETWORKS WITH CYCLIC PACKET SCHEDULING

BACKGROUND OF THE INVENTION

1. Field of the Invention

This invention relates to networked systems, and specifically to an improved system, method, and computer-readable instructions for scheduling, transporting, and receiving inbound packets efficiently in networks with cyclic packet scheduling.

2. Discussion of the Background

Cyclic real-time networks—In a plant or machine where there are several actuator and/or sensor devices, there are many advantages to be gained from connecting these to a central controller using a serial network. These advantages include modularity, reduction in wiring, more extensive central monitoring and improved serviceability. To permit the automation of high performance machines it is generally necessary to issue commands to the actuators frequently and, similarly, to gather data from the sensors frequently. Furthermore it is advantageous for the commands to take effect simultaneously at all of the actuators and similarly for the instant at which measurements take place to be simultaneous at all of the sensors; this is particularly true of motion control systems. Specific serial networks have been devised (e.g., IEC61491-2002 "Adjustable Speed Electric Drive Systems Incorporating Semiconductor Power Converters" (SERCOS™); Interests Group SERCOS interface e. V.: "Specification SERCOS III interface Version 1.20" {Dec. 22, 2004} {from www.sercos.de} U.S. Pat. No. 7,024,257, U.S. Pat. No. 7,143,301, SynqNet) or adapted from standard data transfer networks (e.g., IEC PAS 62408 First edition 2005-06 "Real-time Ethernet Powerlink (EPL)") in order to meet these requirements; the essential characteristics of these networks are that: (a) a controller sends at least one packet containing command and/or other data to each slave sensor/actuator node according to a cyclic, repeating timetable (sometimes called isochronous communication in the literature), (b) the measurements and/or other data are sent from each slave sensor/actuator node to a controller according to a cyclic, repeating timetable, (c) the controller has a master timer and each slave sensor/actuator node on the network has a means of re-constructing the controller's timer, for example by adjusting the local timer on receipt of a timing packet, (d) a high-speed physical layer is used (such as [e.g., ANSI/IEEE Std 802.3u-1995: "IEEE Standards for Local and Metropolitan Area Networks: Supplement to Carrier Sense Multiple Access with Collision Detection (CSMA/CD) Access Method and Physical Layer Specifications Media Access Control (MAC) Parameters, Physical Layer, Medium Attachment Units, and Repeater for 100 Mb/s Operation, Type 100BASE-T (Clauses 21-30)"], dictating that point-to-point connections rather are used (rather than a physically bussed network) which in turn implies the use of repeaters either in the nodes themselves or using hubs.

Several networks are organized in this way (SERCOS I & II, SynqNet, Ethernet-Powerlink, SERCOS III). Such networks can be described as "cyclic real-time networks".

Operation of cyclic real-time networks—In order to aid the readability of this document it is helpful to define some terms. 'Node' means slave node on the network (other than the controller) that optionally has sensor/actuator functionality. 'Inbound' means from any node to the controller. 'Outbound' means from the controller to any node. 'Port' means the circuitry permitting a connection to the network (connector, any isolation means, protection components, transceiver). 'Upstream port' means the network connection port of a node through which inbound packets are sent to the controller. 'Downstream port' means the network connection port or ports of a node through which outbound packets are sent to a further node or nodes. 'Switch' means layer 2 network switch. 'Jitter' refers to the unpredictable and fluctuating delay of a packet. 'Enumeration' means the discovery of nodes and the configuration of nodes by the controller via the network. 'Optimum Inbound Throughput' or simply 'OIT' is the name of this invention. 'PHY' means a network transceiver. Descriptions of the network physical layer will use 100BASE-T terminology.

Cyclic real-time networks can be full-duplex or half-duplex; FIG. 8 shows an example full-duplex cyclic, repeating timetable (whereas FIG. 19 of IEC PAS 62408 First edition 2005-06 "Real-time Ethernet Powerlink (EPL) shows an example half-duplex cyclic, repeating timetable).

A system comprises a controller, carrying out control/monitoring of the systems and one or more nodes that have network functionality and may also have actuation/measurement functions. The nodes are connected to the controller via a high-speed network.

In FIG. 1 the controller 0105 contains a processor subsystem 0101 which executes the control program for loop closure and the sequencing of actions, the controller network logic 0102 which organizes the sending and receiving of packets from the network and houses the master timer for the system (the controller network logic 0102 is typically an FPGA or an ASIC), and at least one 0103 or more 0104 network port(s) comprising a transmitter-receiver circuit such as a 100BASE-T PHY device with associated components.

Referring to FIG. 2, each node 0205 contains the node network logic and buffer circuit 0202 which sends and receives packets from the network as well as housing the node's re-construction of the controller's timer (it is typically an FPGA or an ASIC), at least one but more usually two or more 0201, 0203 network port(s) comprising a transmitter-receiver circuit such as a 100BASE-T PHY device with associated components. Optionally each node can also include a sensor/actuator circuit 0204 which carries out the measurement and actuation function of the node.

The controller and nodes can be interconnected on a network using a line connection topology (see FIG. 6).

In all topologies the packets reach farther nodes by passing through repeaters that are located within intermediate nodes or within dedicated repeating devices. At its simplest (see FIG. 3) a repeater comprises a PHY device 0201 for one port, a PHY device 0203 for the second port, an elasticity buffer 0302 connecting the ports in the upstream direction and a second elasticity buffer 0303 connecting the ports in the downstream direction. The elasticity buffers do not buffer the IDLE symbols that occur between packets, this ensures that the entire packet is forwarded, the number inter-packet IDLE symbols is adjusted to fill the inter-packet gap (i.e. IDLE symbols are appended to the transmitted packet until a further packet is received), in this fashion a packet can be received on one port at one clock rate but can be transmitted from the other port at a slightly different clock rate.

The repeater can be incorporated into a node having sensor/actuator functionality (see FIG. 4) by adding a multiplexer 0404, the remainder of the node network logic 0405 and the sensor/actuator circuit 0204. At all times the node network logic 0405 can receive packets 0406 from the upstream PHY 0201 and these packets are also forwarded to the downstream PHY 0203. When the signal XMIT_A (0401) is TRUE the multiplexer steers packets emitted by the node network logic 0405 along signal path 0402 to the upstream PHY 0201. When the signal XMIT_A is FALSE the circuit acts as a repeater in both directions.

Referring to FIG. 6 and FIG. 8, when network communication is cyclic, the controller 0105 sends outbound packets 0801, 0802, 0803, 0804 to the nodes 0602, 0603, 0604 according to a cyclic timetable. One 0801 of the outbound packets is used by the nodes to re-construct the controller's timer at each node, in a practical system, the timer re-construction circuit can optionally be enhanced by making use of information such as the delay time of the packet in reaching the node in question and the nominal communication cycle period 0809. The nodes send inbound packets 0805, 0806, 0807 back to the controller in accordance with a previously configured cyclic timetable using the re-construction of the controller time.

Scheduling of packets in cyclic real-time networks—In cyclic real-time networks it is essential to ensure that the packets can not collide as the consequential loss of data would impair the ability of the controller to control/monitor the system.

Outbound scheduling—Outbound packets are separated by inter-packet gaps 0813, for which the minimum possible value is determined by various factors: one of these is that if the nodes have successively slower clock oscillators the packets will bunch more closely together as they pass through each node, another is the need to insert some idle time on each network segment so that receiving PHYs can lock their descrambler circuits. In a practical system the minimum outbound inter-packet gap used by the controller can be as short as eight IDLE symbol times.

In the outbound direction all packets are sent by the controller and, provided sufficient idle time is inserted between the packets to accommodate the variation in local oscillator frequencies, collisions can not occur.

There is some flexibility in the outbound schedule of packets. The timing packet 0801 must have a fixed position within the communication cycle 0809 to ensure the correct operation of the timer reconstruction circuit. The total set of outbound packets (0801, 0802, 0803, 0804) must fit within the communication cycle 0809 but, subject to these conditions, the command packets (0802, 0803, 0804) can vary in length or sequence or destination.

Inbound scheduling—In the inbound direction the nodes must send their packets in non-overlapping time-slots; in order to achieve this, the controller has a timer and each node locally reconstructs the controller's timer and each respective node sends its inbound packet(s) in their allotted time slot(s) within the cyclic timetable. Inbound packets are separated by inter-packet gaps 0808. The minimum duration of these gaps is constrained not only by the need to accommodate slight differences in the nodes' clock oscillators and to supply the PHYs with IDLE symbols but more significantly to cope with the uncertainties in the node's re-construction of the controller timer.

There is less flexibility in the inbound schedule of packets; each of the set of inbound packets (0805, 0806, 0807) must fit within the allocated slot times (0810, 0811, 0812). Subject to this set of constraints, each inbound packet can be shorter than the slot time it occupies and similarly the slot times 0810, 0811, 0812 could be used for different nodes from cycle to cycle (e.g. nodes 0, 1, 2 on one cycle and nodes 3, 4, 5 on the alternate cycle).

Timing uncertainty in cyclic real-time networks—Nodes can be connected to the controller using networks supporting various topologies such as a tree FIG. 15 or a line FIG. 6 or a ring FIG. 7. As the node count rises, the delay endured by packets to reach the farthest nodes become significant, especially for the line and ring topologies. The reconstruction of the controller's timer can be made more accurate by taking account of the transmission delay time of the packet to the destination node, this delay comprises the propagation time of the network cabling and the delays of the PHYs and repeaters in each intervening node within the chain. However various timing uncertainties (limitations in the accuracy of the reconstructed clock, variations in local oscillator frequencies and uncertainties in the measurement of the transmission delay time) dictate that the time slot should be longer than the duration of the inbound packet by a contingency time.

These timer uncertainties accumulate with each network cable and repeater traversed by the timing packet; the uncertainty of the re-construction of controller timer at node 2 (0604) is three times that at node 0 (0602). Therefore the contingency time should be longer in networks where many nodes are connected in series and in practice this will seriously reduce the data efficiency of the network in the inbound direction and will therefore limit the network cycle rate that can be achieved. The problem is exacerbated by the fact the cyclic packet loading is generally greater for the inbound direction than for the outbound direction; in most systems there is more data to monitor than to control. In a practical system the minimum inbound inter-packet gap 0808 can be as long as one symbol time per cascaded node plus the minimum of eight IDLE symbol times: e.g. 258 symbol times (10.32 μs when using the 100BASE-T physical layer) for 250 nodes connected in series Cyclic real-time networks then, suffer progressive reductions in the accuracy of each node's reconstruction of the controller timer as the number of intervening repeaters increases and consequentially the utilization of the network in the inbound direction deteriorates as the ability to accurately schedule inbound packets is progressively impaired.

Cyclic real-time networks also have inflexible inbound packet schedules.

Let us now turn our attention to proposed remedies to improve the inbound utilization of cyclic real-time networks and bring flexibility to the inbound packet schedule.

Hubs—One approach to improve the inbound utilization of cyclic real-time networks is to limit the number of intervening repeaters by using repeating hubs to create tree topologies. Powerlink, for example, (IEC PAS 62408 First edition 2005-06 "Real-time Ethernet Powerlink (EPL) page 292 et seq.) uses a combination of repeating hubs and internal repeaters within the sensor/actuator nodes themselves to limit the number of intervening nodes required to reach the farthest node. The structure of a four-port repeating hub is shown in FIG. 14 and operates as follows: the central logic 1407 simply forwards symbols received on any port to all of the other ports and with minimal delay. For example using a tree structure with two tiers of 17-port hubs (one on the first tier and seventeen on the second tier—requiring eighteen hubs in total) it is possible to fan out to more than 250 nodes with only two repeaters in the path to the most distant node from the controller. There are however some significant disadvantages to this solution; firstly hubs are inherently half-duplex whereas there are both throughput and latency advantages to be gained from using full-duplex communication, secondly hubs have been wholly superseded in the mass-market by switches and are thus difficult to obtain and therefore expensive, thirdly hubs are restricted to tree topologies and these inherently can not support the re-routing of packets in the event of a fault that is possible in a ring, fourthly the physical arrangement of the plant or machine may make a tree topology physically inconvenient by obliging multiple cables to run in trunking or cable retractors where only one or two cables would be required for line or ring topologies (this same objection also applies to the use of free-standing switches). The use of repeating hubs is therefore not an ideal solution.

Standard Switches—Another category of partial remedies makes use of standard Ethernet switches. These devices also have a structure of the form shown in FIG. 14 but the operation of the central block 1407 now has at least four, complex functions: selective bridging, store-and-forward, cut-through and flow control.

Selective bridging means that packets are forwarded only to the port to which the destination node is attached. The switch can be configured to steer particular packets to particular ports (in the case of managed switches) or the destination port can be inferred by the switch itself during a learning process that requires the inspection of incoming source addresses (in the case of unmanaged switches). Note that a learning process compromises determinism.

Store-and-forward means that the incoming packet is held in a buffer for re-transmission when the destination port has been determined and when the destination port has become free.

Cut-through attempts to speed-up the store-and-forward process by inspecting the destination address of a packet as it arrives rather than waiting for the whole of the packet to be received.

Flow control causes a pause frame to be sent to a connected node in the event that the switch is too busy to handle further packets on that port.

Switches do promote efficient utilization of the network; they are full-duplex and they do remove the need for the contingency times in the inbound packet schedule because no packet collision will occur even if more than one node is transmitting its inbound packet simultaneously. Switches are complex devices and typically require a processor in combination with additional logic to accelerate packet handling but, owing to mass-manufacture, they have become inexpensive. Despite their many merits in the realm of data networks, switches are not suitable for use in cyclic real-time networks for two main reasons. Firstly, the packet must be a standard Ethernet packet (and thus carry the burden of the 6-byte source address, 6-byte destination address, 2-byte Ethertype field and a minimum of 46 byte data payload) in contrast to the compact packets used on high-performance cyclic real-time networks and in consequence the cyclic rate of the network (for a given number of nodes) is relatively low and latencies are also mediocre in both the outbound and inbound directions. Secondly, the outbound packets suffer an unpredictable and fluctuating delay in reaching the nodes that is in the order of tens of micro-seconds, therefore the packet used for correcting the reconstructed timer in each nodes suffers significant jitter and therefore the reconstructed timer may simply be too inaccurate for measurement and control functions (where timing accuracy on the order of 1 μs may be required). Thus ordinary Ethernet switches can not be used to create cyclic real-time networks that are state-of-the-art in respect of data-efficiency, cyclic rate, latency or timing accuracy.

Modified Switches—Two networks set out to solve the problem of poor timing accuracy by using modified Ethernet switches.

Ethernet/IP (EtherNet/IP™ Specification Volume Two: "EtherNet/IP Adaptation of CIP" (from www.odva.org)) uses IEEE 1588 (IEEE-1588: 2003, "Standard for a Precision Clock Synchronization Protocol for Networked Measurement and Control Systems") to correct the timer in the node. This solution mandates the use of IEEE 1588 circuitry in the controller, the nodes and any intervening free-standing switches.

Profinet/IRT ("Automating with PROFINET: Industrial communication based on Industrial Ethernet: Industrial Communication Based on Industrial Ethernet", by R. Pigan and M. Metter, published by Wiley, ISBN-13: 978-3895782565) has a special timer correction scheme. Simply put, Profinet/IRT uses special switches based on an ASIC to prioritize, on a cyclic basis, those packets that are participating in cyclic, real-time communication. This solution obligates the use of Profinet/IRT circuitry in the controller, the nodes and any intervening free-standing switches.

Both Ethernet/IP and Profinet/IRT do solve the problem of having contingency times in the inbound packet schedule but only by adding circuitry of considerable complexity and expense. However neither network attempts to alleviate the other performance limitations that arise from using standard Ethernet packets (poor data-efficiency, low cyclic rates and longer latencies).

A number of patents exist that describe store-and-forward, cut-through, and other scheduling and transporting techniques, such as U.S. Pat. Nos. 4,933,933, 5,307,345, 5,633,876, 6,094,434, 6,144,668, 6,356,558, all incorporated herein by reference.

SUMMARY OF THE INVENTION

Existing cyclic real-time networks that schedule their inbound packets into allocated time slots suffer from reduced network utilization as the number of nodes connected in series increases. This occurs because of the need to allocate proportionately larger contingency times in each slot to accommodate uncertainties in the accuracy of the re-constructed clock.

The present invention (Optimum Inbound Throughput) maintains good inbound network utilization even at high node counts in any topology, and thus makes practical the use of higher numbers of series connected nodes or higher cyclic rates.

By removing the inter-packet gaps from the schedule of inbound packets, OIT is also useful in minimizing the latency in the return of the data from the nodes.

OIT allows the nominal times that inbound packets are scheduled for transmission to overlap, and therefore a further advantage of the invention is that data transport is more robust, the network can for example tolerate a dynamic change of topology or transient disturbance to the reconstructed timer at any node without risk of inbound packets colliding.

OIT adds little or no piece cost to the controller or to the nodes as it is implemented economically using standard FPGA resources.

The invention provides an improvement to cyclic, real-time networks whereby at a node the re-transmission via the upstream port of inbound packets received from the downstream port can be postponed to allow the transmission of a packet that has been generated locally within the node and by this means ensure that inbound packets cannot collide. In an embodiment, a node has one dedicated upstream port and one downstream port, wherein packets received at the downstream port can be temporarily held in the forwarding buffer. In another embodiment, a node has one dedicated upstream port and more than one downstream port, wherein packets received at any downstream port can be temporarily held in the forwarding buffer associated with each respective downstream port.

In a further embodiment, a node has two ports each of which has a forwarding buffer taking input from each respective port's input, the operation of the ports can be configured during network enumeration so that one port functions as the upstream port and the other functions downstream port, wherein packets received at the port functioning as the downstream port can be temporarily held in the forwarding buffer connected to that port. In this embodiment, where the function of the ports is exchanged as a result of a network fault, causing the forwarding buffer that takes input from the newly assigned downstream port to become active and the forwarding buffer attached to the newly assigned upstream port to be kept empty.

In a network wherein a node has two ports, the operation of the ports can be configured during network enumeration so that one port functions as the upstream port and the other functions downstream port, and a single forwarding buffer can be configured to take input from the port functioning as the downstream port so that packets received at the port functioning as the downstream port can be temporarily held in the forwarding buffer connected to that port, and when the function of the ports is exchanged as a result of a network fault then any packet previously loaded into said single buffer will subsequently be transmitted through the newly assigned upstream port. The function of the ports can be exchanged in response to a network fault while maintaining the operation of the forwarding buffer for inbound packets.

In a network wherein a node has two or more downstream ports each of which has a forwarding buffer connected to each respective port's input and one upstream port, the packets received at the downstream ports can be temporarily held in the forwarding buffer connected to that port for subsequent re-transmission through the upstream port when said upstream port is not transmitting the locally originated packet or when said upstream port is not transmitting a packet from another downstream port.

In a network wherein a node has three or more ports each of which has a forwarding buffer connected to each respective port's input, the operation of the ports can be configured during network enumeration so that one port functions as the upstream port and the others function as downstream ports, packets received at the ports functioning as downstream ports can be temporarily held in the forwarding buffer connected to that port for subsequent re-transmission through the upstream port when said upstream port is not transmitting the locally originated packet or when said upstream port is not transmitting a packet from another downstream port.

In a network, the cyclic schedule for the transmission of inbound packets is arranged so that the nominal packet slot times overlap to ensure that the inbound packets arrive at the controller with minimal inter-packet gaps. Alternately, the cyclic schedule for the transmission of inbound packets is arranged as two or more sets of packets, wherein the packet slot times in each set are overlapping but the sets of packets are spaced in time to ensure that all of the packets of the first set of packets arrive at the controller before any of the packets of the succeeding set of packets, and in this way permit inbound packets to be grouped into prioritized sets. Moreover, the cyclic schedule for the transmission of inbound packets is arranged so that schedule of packets varies in respect of packet lengths or which nodes send what packets.

Further comprising an embodiment where the nodes periodically insert additional inter-packet idles symbols to maintain scrambler lock.

Still further comprising a network where the controller network control logic has a built-in sorting mechanism so as to present the set of received packets in a consistent order to its processor.

The invention can be implemented in numerous ways, including as a system, a device, a method, or a computer readable medium.

As a method, an embodiment comprises a method for improved transmission efficiency of upstream packets in cyclic networks having a controller and plurality of nodes by reducing inbound packet spacing at the controller, comprising: scheduling upstream packet transmission slots for each node in the network so that the spacing between the packet transmission slots is reduced; for each node in the network, if there is a locally originated packet of the node to be transmitted upstream, selectively activating a forwarding buffer to receive and temporarily store a packet received from a neighboring downstream node during upstream transmission of a locally originated packet of the node; and upon completion of the upstream transmission of the locally originated packet, transmitting upstream the packet stored in the forwarding buffer.

In further embodiments, the spacing between the packet transmission slots is reduced so that the packet transmission slots are overlapping in time. Moreover, the non-overlapping portion of the transmission slot is greater than the uncertainty of a reconstructed timer in each node so that the inbound packets at the controller arrive in the same order in which they were transmitted. Still further, the non-overlapping portion of the transmission slot is less than the uncertainty of a reconstructed timer in each node so that the inbound packets arrive at the controller in an indeterminate sequence and therefore require sorting. Also, the upstream packet transmission slots for each node in the network are scheduled for simultaneous transmission thereby overlapping in time.

In further embodiments, the method further includes the inbound packets received at the controller according to the contents of packet in order to present the node data to the controller's processor in a consistent form. Sorting comprises inspecting the source address of the packet to determine the ordering for the sorting.

In further embodiments, the method further includes scheduling a set of lower priority packets of the nodes to arrive at the controller after a set of higher priority packets of the nodes by scheduling the upstream packet transmission slots for the lower priority packets to begin at a point in time after the last higher priority packet has begun to be received by the controller. A guard band, which is a duration of time greater than the timer uncertainty of the node scheduled to transmit its status packet first, is used to determine the point in time to begin transmission of the lower priority batch of packets.

In further embodiments, the method further includes each forwarding node appending a minimum sequence of IDLE symbols to every packet sent. The node's forwarding buffer may be combined with the node's elasticity buffer.

Numerous topologies are contemplated. For example, the network may be arranged in a line topology. Or, the network may be arranged in a ring topology with each node having two ports, wherein one port selectively serves as the upstream port and one port selectively serves as the downstream port. The topology may comprise a ring of rings or a ring of trees.

In still further embodiments, the forwarding buffer is utilized by the port serving as the upstream port. For example, a single forwarding buffer is dynamically switched to be utilized by the port serving as the upstream port in the ring. Each port may comprise a forwarding buffer with only the forwarding buffer of the upstream port being utilized and the forwarding buffer for the downstream port remaining unutilized, depending on which port is serving as the upstream port and the downstream port in the ring. Where the network is arranged in a tree topology, each node may have a plurality of downstream ports and wherein each downstream port has a respective forwarding buffer. Prior to transmitting upstream the packet received from the neighboring downstream node, the invention may further include selectively controlling with an arbitration scheme the outputs of the forwarding buffers for re-transmission through the upstream port. The arbitration scheme may comprise alternating the outputs of the forwarding buffers.

For tree topologies, an embodiment of the invention includes a method for improved transmission efficiency of upstream packets in cyclic networks having a controller and plurality of nodes in a tree topology by reducing inbound packet spacing at the controller, comprising: scheduling upstream packet transmission slots for each node in the network so that the spacing between the packet transmission slots is reduced; for each node in the network having a plurality of downstream ports, providing each downstream port with a respective forwarding buffer, and selectively activating the forwarding buffer to receive and temporarily store a packet received from a neighboring downstream node; transmitting packets stored in each downstream port's respective forwarding buffer to a secondary forwarding buffer; upon completion of the upstream transmission of a locally originated packet, outputting the packets stored in the secondary forwarding buffer for re-transmission through the upstream port.

In further embodiments, the secondary forwarding buffer has a capacity for at least half a cycle of network traffic. The secondary forwarding buffer may be located in an external memory device.

The invention also comprises a cyclic network allowing for improved transmission efficiency of upstream packets by reducing inbound packet spacing at the controller comprising: a plurality of nodes on the network arranged in a line topology, each node communicating with each other, wherein each node comprises a forwarding buffer; a network controller for scheduling upstream packet transmission slots for each node in the network so that the spacing between the packet transmission slots is reduced; node network logic for each node in the network, configured such that if there is a locally originated packet of the node to be transmitted upstream, selectively activating the forwarding buffer to receive and temporarily store a packet received from a neighboring downstream node during upstream transmission of a locally originated packet of the node; and upon completion of the upstream transmission of the locally originated packet, transmitting upstream the packet stored in the forwarding buffer.

In further embodiments, the upstream packet transmission slots may overlap in time. The cyclic network may also include a sorting engine for sorting inbound packets received at the controller.

An embodiment also includes a cyclic network allowing for improved transmission efficiency of upstream packets by reducing inbound packet spacing at the controller comprising: a plurality of nodes on the network arranged in a ring topology, each node communicating with each other and having two ports, wherein one port selectively serves as the upstream port and one port selectively serves as the downstream port, wherein each node further comprises a forwarding buffer; a network controller for scheduling upstream packet transmission slots for each node in the network so that the spacing between the packet transmission slots is reduced; and node network logic for each node in the network, configured such that if there is a locally originated packet of the node to be transmitted upstream, selectively activating the forwarding buffer utilized by the port serving as the upstream port to receive and temporarily store a packet received from a neighboring downstream node during upstream transmission of a locally originated packet of the node; and upon completion of the upstream transmission of the locally originated packet, transmitting upstream the packet stored in the forwarding buffer. A single forwarding buffer may be dynamically switched to be utilized by the port serving as the upstream port in the ring. Each port may include a forwarding buffer with only the forwarding buffer of the upstream port being utilized and the forwarding buffer for the downstream port remaining unutilized, depending on which port is serving as the upstream port and the downstream port in the ring. The upstream packet transmission slots may overlap in time. An embodiment may further include a sorting engine for sorting inbound packets received at the controller.

An embodiment also includes a cyclic network allowing for improved transmission efficiency of upstream packets by reducing inbound packet spacing at the controller comprising: a plurality of nodes on the network arranged in a tree topology, each node communicating with each other, wherein each node having a plurality of downstream ports and wherein each downstream port has a respective forwarding buffer; a network controller for scheduling upstream packet transmission slots for each node in the network so that the spacing between the packet transmission slots is reduced; and node network logic for each node in the network, configured such that if there is a locally originated packet of the node to be transmitted upstream, selectively activating the forwarding buffers for each downstream port to receive and temporarily store a packet received from its respective neighboring downstream node during upstream transmission of a locally originated packet of the node; and upon completion of the upstream transmission of the locally originated packet, selectively controlling with an arbitration scheme the outputs of the forwarding buffers for re-transmission through the upstream port. The arbitration scheme may include alternating the outputs of the forwarding buffers. Further, the upstream packet transmission slots may overlap in time. An embodiment may also include a sorting engine for sorting inbound packets received at the controller.

A still further embodiment also includes a cyclic network allowing for improved transmission efficiency of upstream packets by reducing inbound packet spacing at the controller comprising: a plurality of nodes on the network arranged in a tree topology, each node communicating with each other, wherein each node having a plurality of downstream ports and wherein each downstream port has a respective forwarding buffer; a secondary forwarding buffer to which each downstream port's respective forwarding buffer is connected; a network controller for scheduling upstream packet transmission slots for each node in the network so that the spacing between the packet transmission slots is reduced; and node network logic for each node in the network, configured to selectively activate the forwarding buffers for each downstream port to receive and temporarily store a packet received from its respective neighboring downstream node and transmit the stored packets to the secondary forwarding buffer during upstream transmission of a locally originated packet of the node; and upon completion of the upstream transmission of a locally originated packet, outputting the packets stored in the secondary forwarding buffer for re-transmission through the upstream port. The secondary forwarding buffer may have a capacity for at least half a cycle of network traffic.

The secondary forwarding buffer may be located in an external memory device. The upstream packet transmission slots may overlap in time. An embodiment may further include a sorting engine for sorting inbound packets received at the controller.

In further embodiments, each forwarding node may append sufficient IDLE symbols to every packet sent to accommodate variations in node clock frequencies and periodically append additional IDLE symbols to maintain scrambler lock at the upstream network device. Also, there may be more than two prioritized batches packets.

Sorting the inbound packets received at the controller may be according to the source address of packet in order to present the node data to the controller's processor in a consistent form.

As a computer-readable medium, the invention may comprise code devices for implementing the method for improved transmission efficiency of upstream packets in cyclic networks having a controller and plurality of nodes by reducing inbound packet spacing at the controller, comprising: code devices for scheduling upstream packet transmission slots for each node in the network so that the spacing between the packet transmission slots is reduced; code devices for, for each node in the network, if there is a locally originated packet of the node to be transmitted upstream, selectively activating a forwarding buffer to receive and temporarily store a packet received from a neighboring downstream node during upstream transmission of a locally originated packet of the node; and upon completion of the upstream transmission of the locally originated packet, transmitting upstream the packet stored in the forwarding buffer. As a computer-readable medium, the invention may comprise code devices for implementing the other methods described herein.

Further objects and advantages of our invention will become apparent from a consideration of the drawings and the technical description.

All patents, patent applications, provisional applications, and publications referred to or cited herein, or from which a claim for benefit of priority has been made, are incorporated herein by reference in their entirety to the extent they are not inconsistent with the explicit teachings of this specification.

BRIEF DESCRIPTION OF THE DRAWINGS

A more complete appreciation of the invention and many of the attendant advantages thereof will be readily obtained as the same become better understood by reference to the following detailed description when considered in light of the following drawings, wherein.

Figure 1:
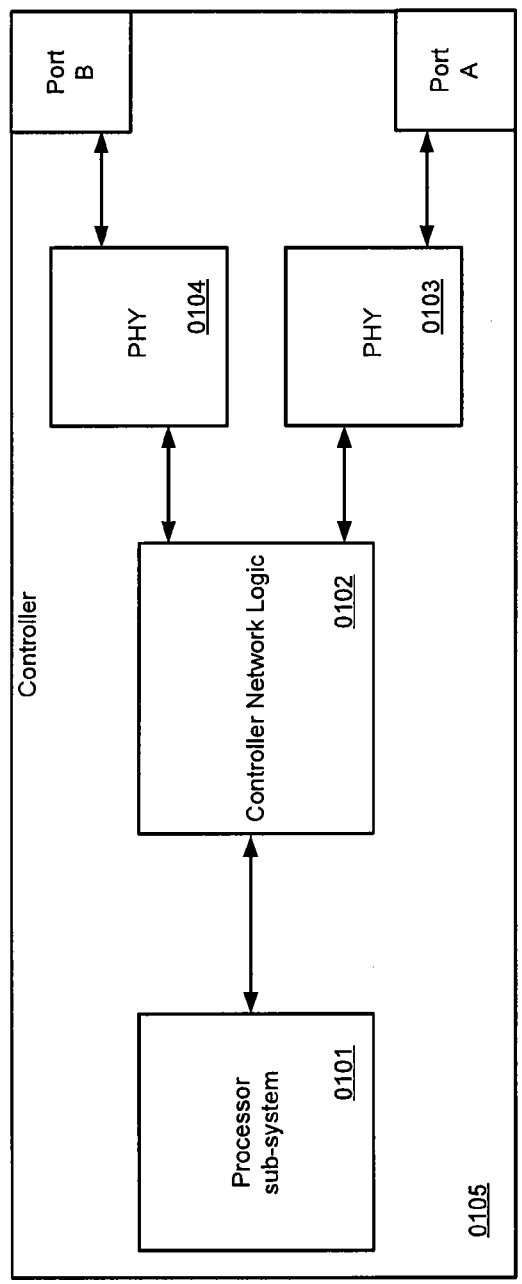
FIG. 1: Internal structure of a controller (prior art).
Figure 2:
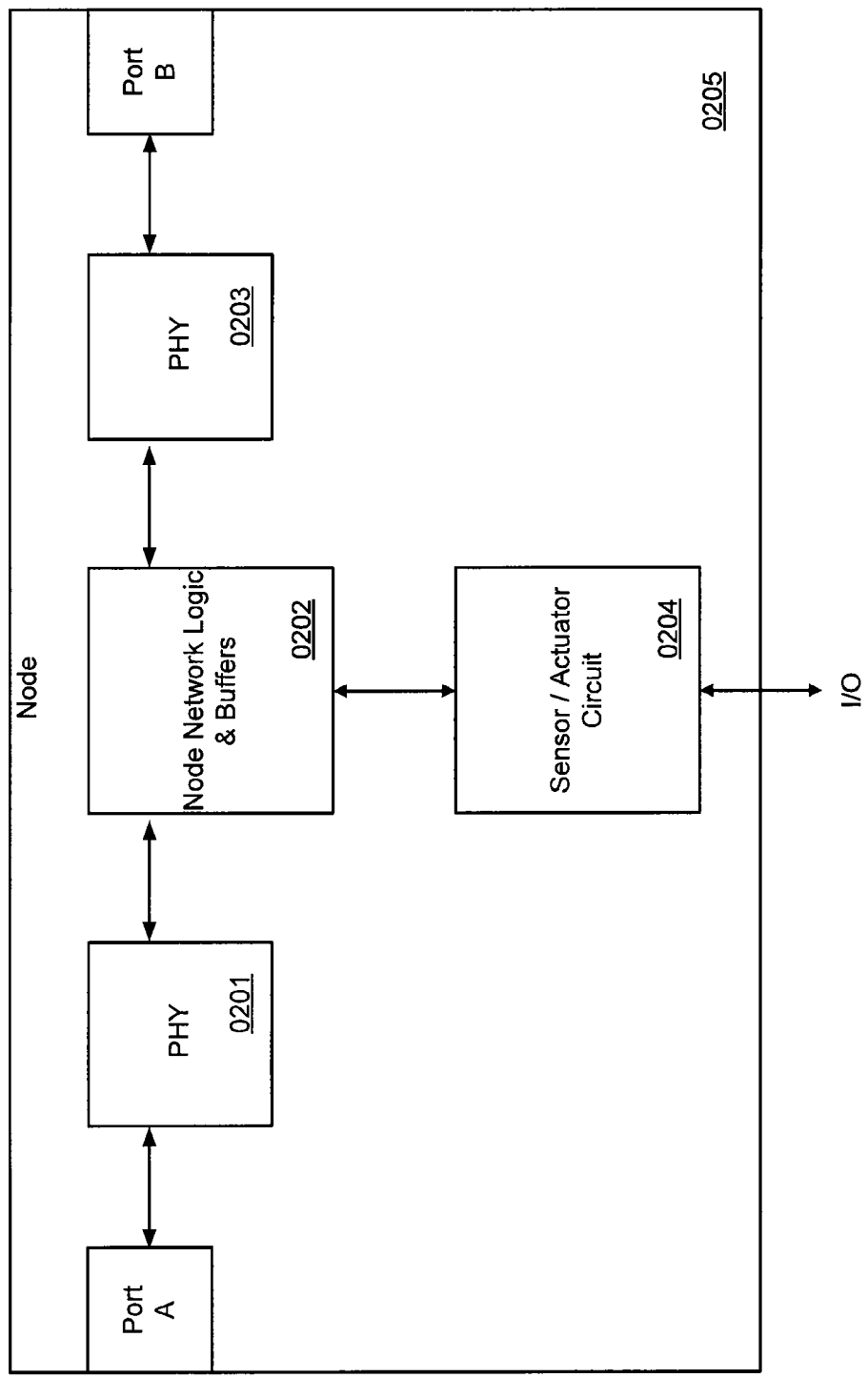
FIG. 2: Internal structure of a node (prior art).
Figure 3:
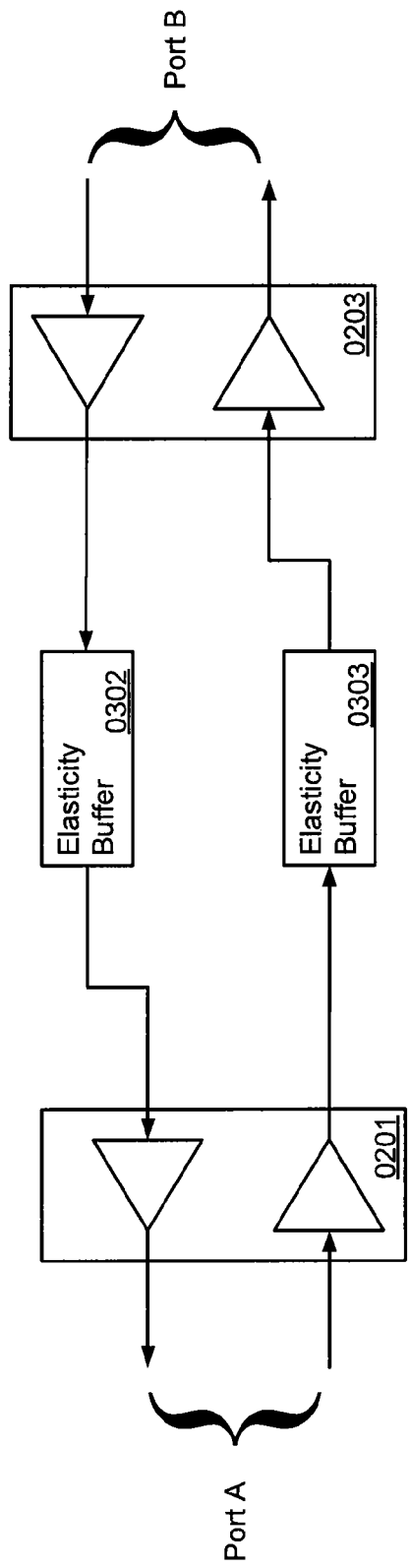
FIG. 3: A two-port repeater circuit of a node (prior art).

It should be understood that in certain situations for reasons of computational efficiency or ease of maintenance, the ordering of the blocks of the illustrated flow charts could be rearranged or moved inside or outside of the illustrated loops by one skilled in the art. While the present invention will be described with reference to the details of the embodiments of the invention shown in the drawing, these details are not intended to limit the scope of the invention.

| Table of Reference Numerals | |
|---|---|
| 0101 | Processor sub-system within the controller |
| 0102 | Controller network logic |
| 0103 | Port A physical layer transceiver (PHY) within the controller |
| 0104 | Port B physical layer transceiver (PHY) within the controller |
| 0105 | Controller |
| 0201 | Port A physical layer transceiver (PHY) within a node |
| 0202 | Node network logic, including buffers |
| 0203 | Port B physical layer transceiver (PHY) within a node |
| 0204 | Sensor/actuator circuit within a node |
| 0205 | A node, showing its internal structure |
| 0302 | Elasticity buffer from Port B |
| 0303 | Elasticity buffer from Port A |
| 0401 | Control signal set from node network logic, that selects which input to the multiplexer 0404 is gated to the Port A PHY 0201 |
| 0402 | Signal path from network node logic carrying local packet for transmission |
| 0403 | Signal path from Port B elasticity buffer logic carrying inbound packet for re-transmission |
| 0404 | Multiplexer that selects signal for transmission from A port |
| 0405 | Network node logic (excluding buffers) |
| 0406 | Signal path carrying packets from the elasticity buffer 0303 |
| 0501 | Control signal set from node network logic, that selects which input to the multiplexer 0502 is gated to the Port B PHY 0203 |

Table of Reference Numerals

| | |
|---|---|
| 0502 | Multiplexer selects signal for transmission from B port |
| 0602 | Node 0 (same internal structure as 0205) |
| 0603 | Node 1 (same internal structure as 0205) |
| 0604 | Node 2 (same internal structure as 0205) |
| 0605 | Network point-to-point link |
| 0606 | Network point-to-point link |
| 0607 | Network point-to-point link |
| 0701 | Redundant return network link to complete ring |
| 0801 | Outbound packet, conveys timing information to all nodes |
| 0802 | Outbound packet, conveys command value to node 0 |
| 0803 | Outbound packet, conveys command value to node 1 |
| 0804 | Outbound packet, conveys command value to node 2 |
| 0805 | Inbound packet, conveys feedback value from node 0 |
| 0806 | Inbound packet, conveys feedback value from node 1 |
| 0807 | Inbound packet, conveys feedback value from node 2 |
| 0808 | Duration of gaps between inbound packets |
| 0809 | Period of communication cycle |
| 0810 | Duration of 0805 |
| 0811 | Duration of 0806 |
| 0812 | Duration of 0807 |
| 0813 | Duration of gaps between outbound packets |
| 0901 | Forwarding buffer from Port B to Port A |
| 0902 | Signal carrying packet from the forwarding buffer 0901 |
| 0903 | Set of status signals from the forwarding buffer 0901; comprising READY_A that indicates that said forwarding buffer has transmitted the end of a packet and EMPTY_A that indicates that said forwarding buffer is empty . |
| 0904 | Signal HOLD_A that causes the forwarding buffer 0901 to buffer rather than transmit |
| 1005 | Scheduled slot when node attempts transmission of packet 0805 |
| 1006 | Scheduled slot when node attempts transmission of packet 0806 |
| 1007 | Scheduled slot when node attempts transmission of packet 0807 |
| 1008 | Temporal underlap of scheduled slots 1005 and 1006 |
| 1009 | Temporal underlap of scheduled slots 1006 and 1007 |
| 1010 | Duration of gaps between inbound packets |
| 1102 | Forwarding buffer from Port A to Port B |
| 1104 | Set of status signals from the forwarding buffer 1102; comprising READY_B that indicates that said forwarding buffer has transmitted the end of a packet and EMPTY_B that indicates that said forwarding buffer is empty. |
| 1105 | Signal HOLD_B that causes the forwarding buffer 1102 to buffer rather than transmit |
| 1202 | FIFO that buffers (unsorted) incoming packets |
| 1203 | Sorting engine |
| 1204 | Circuit for detecting erroneous packets |
| 1205 | Memory holding sorted packets |
| 1206 | Memory holding table of packet descriptors |
| 1207 | Elasticity buffer |
| 1302 | Step to determine whether forwarding buffer is transmitting a packet |
| 1303 | Step to determine whether instant for node to transmit its own packet has been reached |
| 1304 | Step during which the node transmits its own packet |
| 1305 | Step during which the node transmits a group of IDLE symbols |
| 1401 | Port C physical layer transceiver (PHY) within a node |
| 1402 | Port D physical layer transceiver (PHY) within a node |
| 1403 | Elasticity buffer from Port C |
| 1404 | Elasticity buffer from Port D |
| 1407 | Arbitration and packet forwarding logic |
| 1502 | Four-port node with one upstream port and three downstream ports |
| 1503 | As 1502 |
| 1504 | As 1502 |
| 1505 | As 1502 |
| 1601 | First inbound packet, conveys feedback value from an indeterminate node |
| 1602 | Second inbound packet, conveys feedback value from an indeterminate node |
| 1603 | Third inbound packet, conveys feedback value from an indeterminate node |
| 1604 | Scheduled instant for all nodes to attempt to transmit their respective feedback packets |
| 1701 | First inbound packet from second batch, conveys status value from an indeterminate node |
| 1702 | Second inbound packet from second batch, conveys status value from an indeterminate node |
| 1703 | Third inbound packet from second batch, conveys status value from an indeterminate node |
| 1704 | Instant at which last feedback packet has begun to be received by the controller |
| 1705 | Scheduled slot when node attempts transmission of status packet from node 0 |
| 1706 | Scheduled slot when node attempts transmission of status packet from node 1 |
| 1707 | Scheduled slot when node attempts transmission of status packet from node 2 |
| 1708 | Scheduled instant for all nodes to attempt to transmit their respective status packets |
| 1709 | Guard-band applied to 1704 to obtain 1708 |
| 1801 | Four-port node that can be configured to be any of a symmetric repeater and forwarding buffer between any pair of ports two pairs of symmetric repeater and forwarding buffers between any two pairs of ports a node with any port acting as the one upstream port and others acting as three downstream ports |
| 1802 | As 1801 |
| 1803 | As 1801 |
| 1804 | As 1801 |
| 1805 | As 1801 |
| 1806 | As 1801 |
| 1807 | As 1801 |
| 1808 | As 1801 |
| 1923 | Port C physical layer transceiver (PHY) within a node |
| 1932 | Elasticity buffer from Port C |
| 1943 | Signal path from Port C elasticity buffer logic carrying inbound packet for re-transmission |
| 1991 | Forwarding buffer from Port C to Port A |
| 1992 | Signal carrying packet from forwarding buffer 1991 |
| 1993 | Set of status signals from the secondary forwarding buffer 1991; comprising READY_C that indicates that said forwarding buffer has transmitted the end of a packet and EMPTY_C that indicates that said forwarding buffer is empty. |
| 1994 | Signal HOLD_C that causes the forwarding buffer 1991 to buffer rather than transmit |
| 2101 | Secondary forwarding buffer |
| 2102 | Concentrator circuit, forwards packets alternately from forwarding buffers 0901 and 1991 to secondary forwarding buffer 2101 |
| 2103 | Set of status signals from the forwarding buffer 2101; comprising READY_S that indicates that said forwarding buffer has transmitted the end of a packet and EMPTY_S that indicates that said forwarding buffer is empty. |
| 2104 | Signal HOLD_S that causes the secondary forwarding buffer 2101 to buffer rather than transmit |
| 2105 | Signal conveying packets from concentrator 2102 to the that the secondary forwarding buffer 2101 |
| 2106 | Signal conveying packets from the secondary forwarding buffer 2101 to the multiplexer 0404 |

DETAILED DESCRIPTION OF THE PREFERRED EMBODIMENTS

Referring now to the drawings, wherein like reference numeral designate identical or corresponding parts throughout the several views, example networks upon which the invention can be utilized are shown.

OIT was developed for classic, cyclic real-time networks which comprise:

1. A controller, with at least one network port,

2. From 1 to N nodes (including nodes that have no function other than network connectivity), each with an upstream network port and zero or one or more downstream network ports, 3. Controller and nodes are cabled in a line topology, 4. A physical layer that comprises links from one node to the another node (such as 100BASE-T) rather than in a bus, 5. Communication according to a cyclic repeating timetable schedule configured by the controller. The repeating timetable which ensures that the inbound packets cannot collide.

OIT modifies classic, cyclic real-time networks as follows:

6. Changes to the network digital logic at each node to implement the asymmetric buffering,
7. Changes to the transmit packet schedule from the nodes to pack the inbound packets more tightly,
8. Implementation of a hardware sorting device at the controller.

The basic idea of the invention is arrange for each node to have a much larger buffer (in addition to the elasticity buffer) which is selectively activated for packets sent upstream to the controller from the neighboring node only. Thus each node can send its locally originated inbound packet while temporarily storing any packet sent to it from the any downstream node. By making each node's respective forwarding buffer longer than the maximum size of the locally originated inbound packet it is possible to eliminate the contingency time, indeed the scheduled transmission times of the inbound packets can be arranged to overlap and this will result in inbound packets that reach the controller packed as closely as possible thereby maximizing the network utilization in the inbound direction.

A related aspect of the invention is that the inbound data must be made available in a consistent form to be convenient for subsequent computations by the controller (i.e. forming a process image). Previously this was achieved by arranging for the timetable for sending packets from the nodes to have a fixed sequence. This had the side-effect that the packets would arrive in the sequence set by the timetable and by this means the incoming packets were pre-sorted into a consistent order. A consequence of using OIT is that the inbound packets may arrive out of order at the controller because an inbound packet may already be undergoing transmission when a given node is scheduled to send its locally originated packet. With OIT it is therefore necessary to sort the received packets at the controller so as to create the process image and, although this action could be performed by the controller's processor, in practice this would be a profligate use of the controller's processor and therefore a fast, hardware sorting technique based on inspecting the source addresses or other content of the incoming packets is preferred.

OPERATION

Main Embodiment

Figure 4:
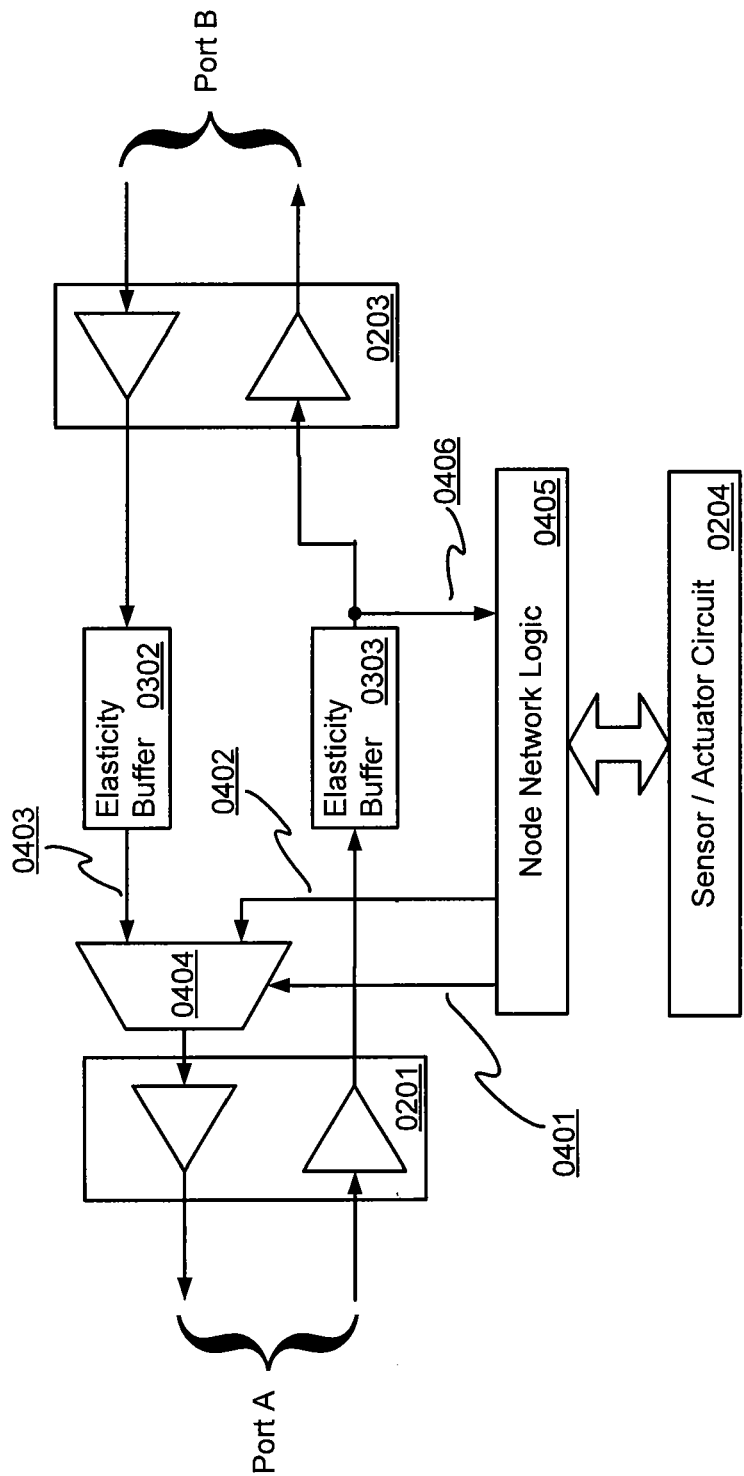
FIG. 4: A two-port node with integral repeaters and the capability to transmit inbound packets via Port A (prior art).
Figure 9:
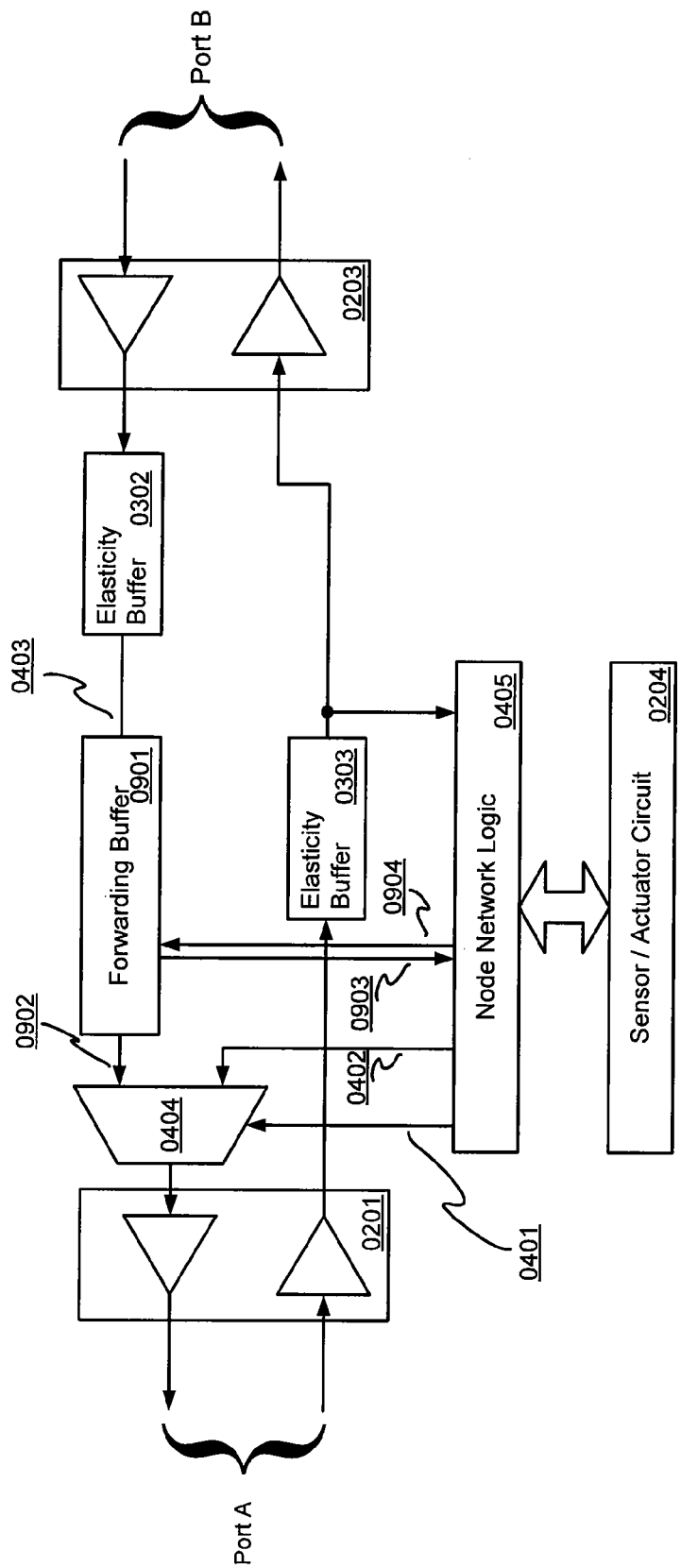
FIG. 9: A two-port node with integral repeaters, the capability to transmit inbound packets via Port A and a forwarding buffer for packets received from Port B.

Modifications to the node repeater circuit—OIT modifies the basic, prior art, node repeater circuit of FIG. 4 to create that of FIG. 9. The forwarding buffer 0901 is a buffer whose contents are of dynamic length. The maximum length of the forwarding buffer 0901 (i.e. its capacity) is equal to that of the largest packet that the node can emit and the minimum length is zero. The forwarding buffer 0901 operates as follows, the input signal 0403 is a data stream (having data, a "data valid" indication signal and a clock), the output signal 0902 is also a data stream (having data, a "data valid" indication signal and a clock). The buffer 0901 will only buffer valid input data plus a marker to indicate that the end of a packet has been reached.

The buffer 0901 fills when there is valid data at its input 0403 and the control signal HOLD_A 0904 is TRUE.

The buffer 0901 empties (and in doing so presents valid data at its output 0902) when the control signal HOLD_A 0904 is FALSE.

The size of the contents of the buffer 0901 is essentially static when there is valid data at its input 0403 and the control signal HOLD_A 0904 is FALSE, the only exception arises from the small disparities between the input and output clock rates—this is a minor effect.

Figure 13:
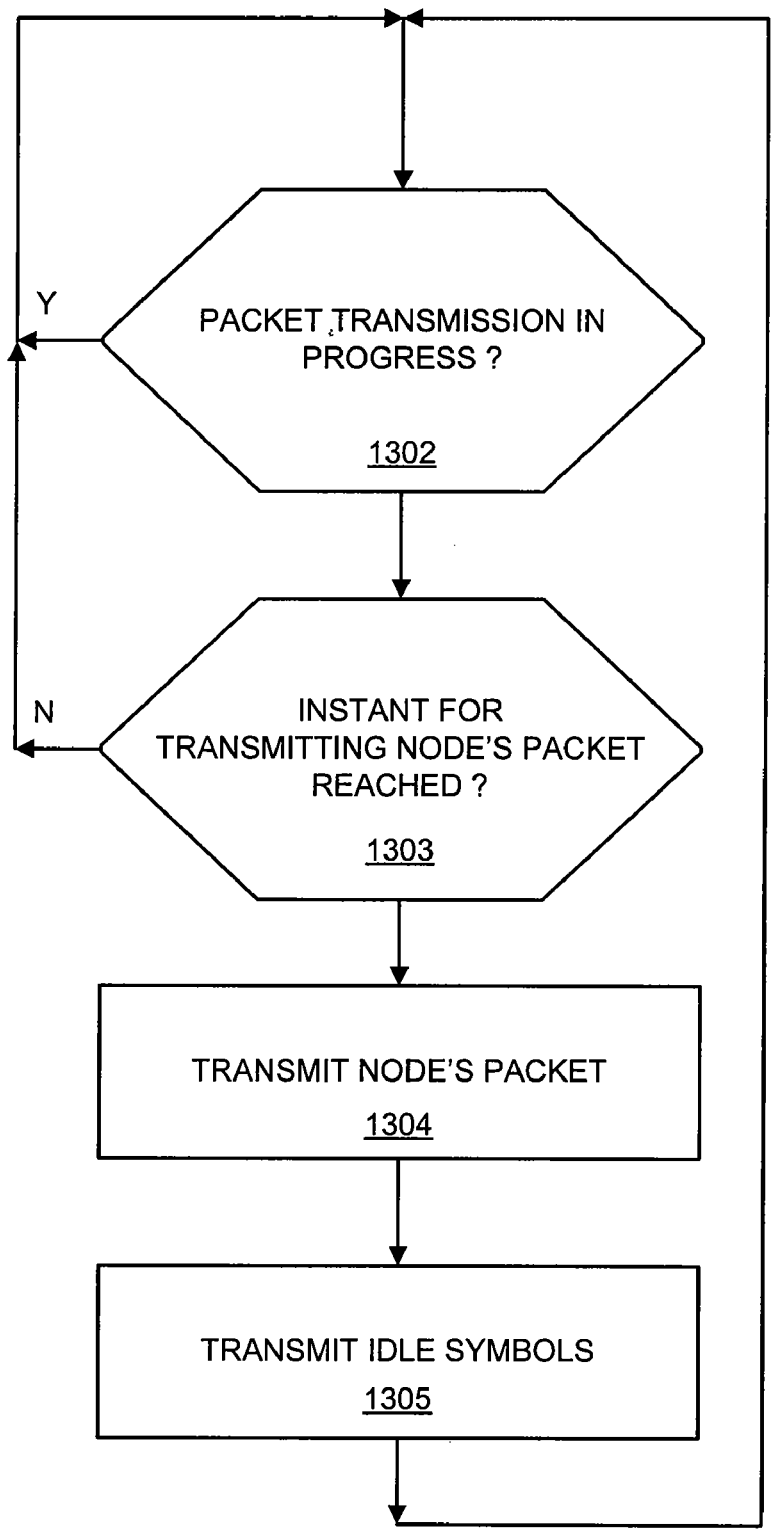
FIG. 13: Flow diagram showing how the node network logic arbitrates between local packet transmission and the forwarding buffer.
Figure 14:
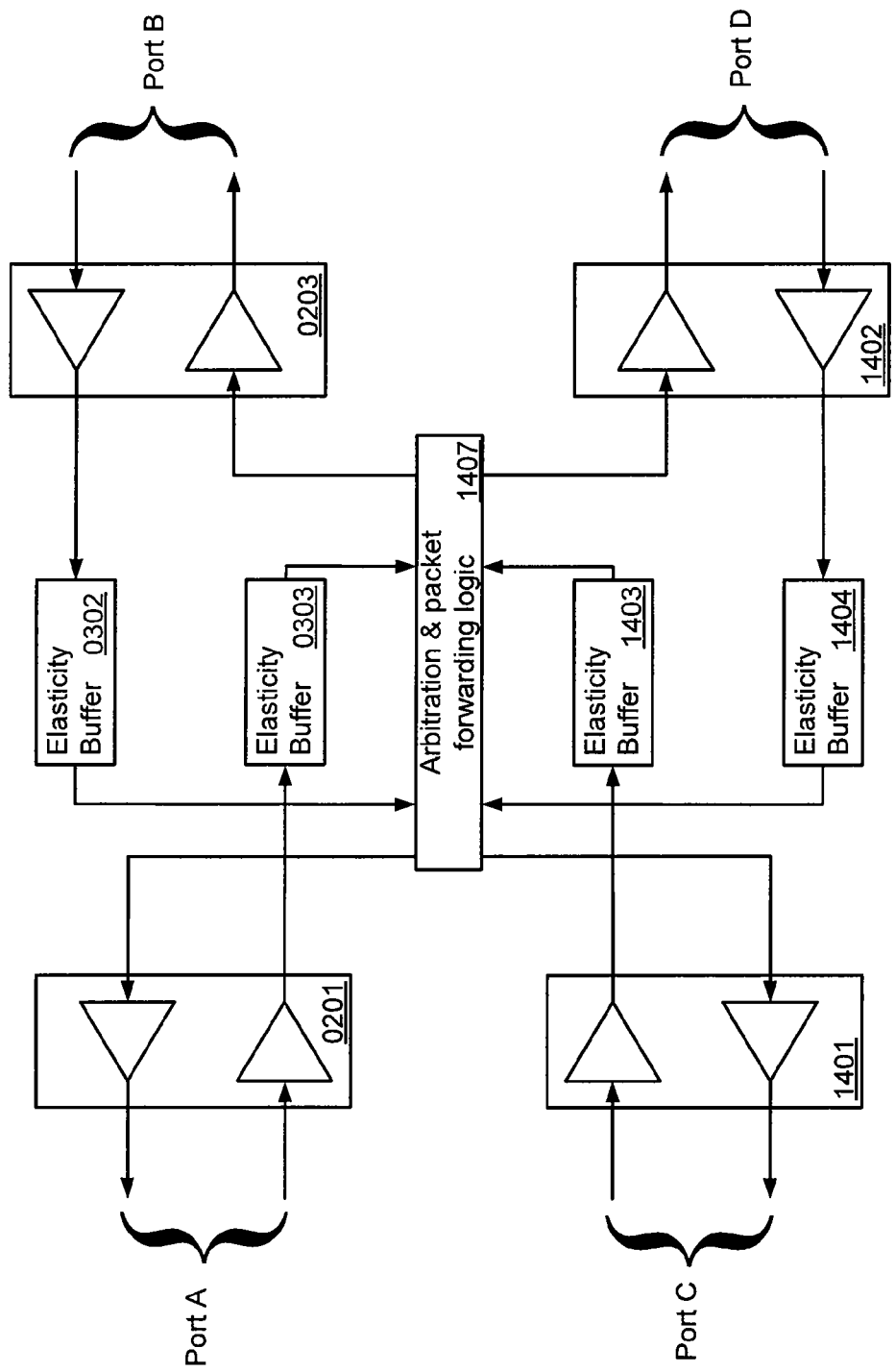
FIG. 14: Structure of a repeating hub or switch (prior art).

Suppose that initially 1302 (see FIG. 13) a packet is being passed from the Port B PHY 0203, via elasticity buffer 0302 and forwarding buffer 0901 and multiplexer 0404 to the upstream port 0201; under these conditions signals XMIT_A 0401, READY_A 0903 and HOLD_A 0904 are FALSE.

As soon as the current packet has ended, the signal READY_A 0903 becomes TRUE and, if (1303) the network node logic 0405 has a packet ready to send, it sets signals HOLD_A 0904 and XMIT_A 0401 to TRUE. Thereafter the packet data 0403 is transmitted 1304 from the network node logic 0405 via the multiplexer 0404 and the upstream port 0201. When the transmission of the packet from network node logic 0405 has completed, there is a brief pause 1305 to insert some IDLE symbols and then 1302 network node logic 0405 sets HOLD_A 0904 and XMIT_A 0401 to FALSE thereby causing whatever packet is in the forwarding buffer 0901 to be transmitted through the multiplexer 0404 and the upstream port 0201. As soon as that packet has ended, the signal READY_A 0903 becomes TRUE and, if the network node logic 0405 does not have a packet ready to send, it sets signal HOLD_A 0904 to TRUE briefly in order to insert some IDLE symbols and then sets signal HOLD_A 0904 back to FALSE to allow further transmission from the forwarding buffer 0901. This arbitration scheme can be summarized as "transmit the locally originated packet as soon as possible, otherwise transmit the packets received from the downstream port".

Note that capacity of the forwarding buffer 0901 only has to be as large as the largest packet that the network node logic 0405 will transmit (plus an allowance for any IDLE symbols that are appended); whereas much larger packets can pass through the forwarding buffer 0901—they are simply delayed by a time equal to the duration of the largest locally originated packet.

Note that IDLE symbols are appended to all packets transmitted through the upstream port 0201 whether they originate from the network node logic 0405 or come from the downstream port 0203. This ensures that the receiving port of the adjacent node or controller is supplied with sufficient IDLE symbol to synchronize its scrambler and to allow for small node-to-node clock disparities.

Figure 11:
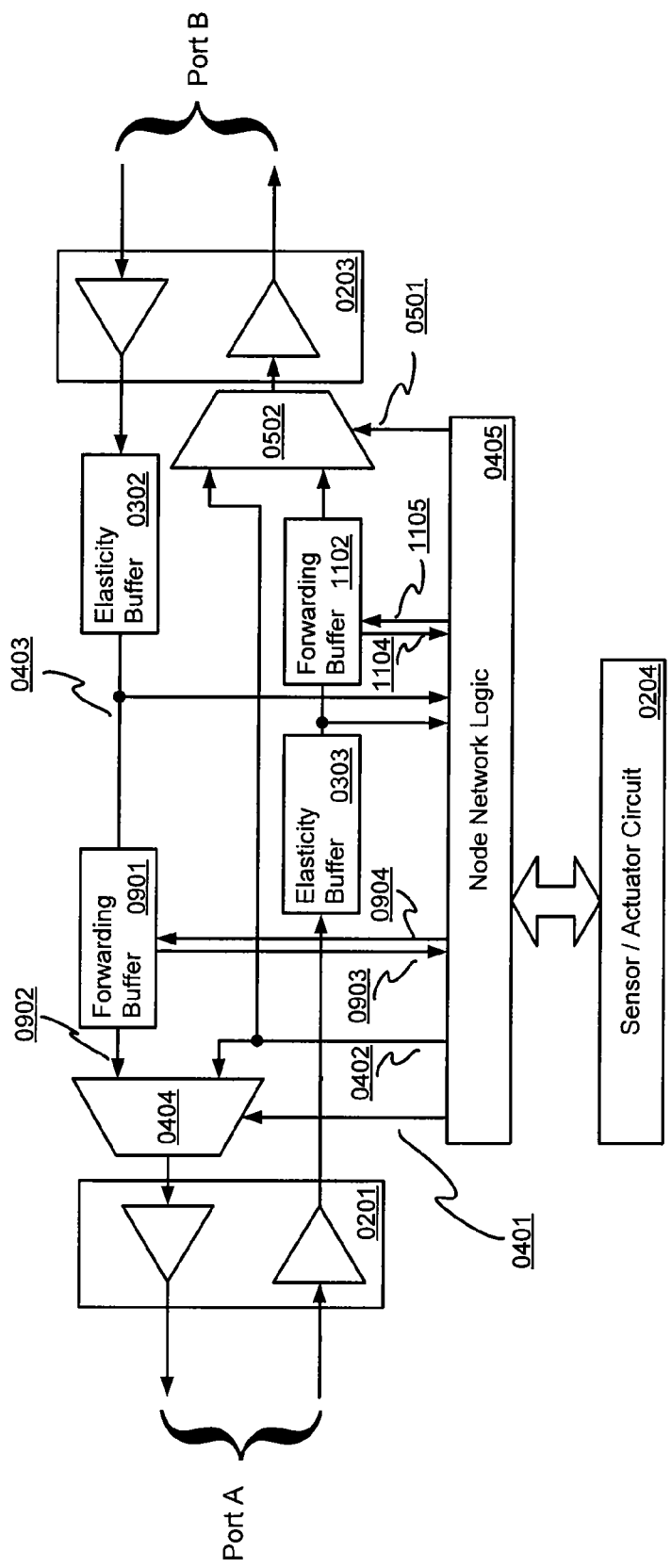
FIG. 11: Node network circuitry with integral repeaters, the capability to transmit inbound packets via Port A or Port B and a forwarding buffer from Port B and a forwarding buffer from Port A.

The preferred physical embodiment of the node circuitry of FIG. 9 or FIG. 11 is to use an programmable logic such as an FPGA as these devices have sufficient gate and memory resources ["Spartan-3E FPGA Family: Complete Data Sheet DS312 Mar. 21, 2005", published by Xilinx Inc.] and may already be present in the node to fulfill the sensor/actuator function; the incremental piece cost of implementing OIT over existing networks is low and may even be zero.

Note that the forwarding buffer is active for inbound packets only. This is an asymmetric arrangement unlike a repeater, a hub or switch. Unlike a hub an OIT node such as FIG. 9, 11, or 21 supports full-duplex operation. Unlike a switch there is no cut-through action and therefore no need to inspect packet addresses. Unlike a switch there is no selective bridging and therefore no requirement to learn traffic routing (all upstream packets go to the upstream port and all downstream packets go to all downstream ports). Unlike a switch there is no uncertainty or delay introduced into the timing of outbound packets; they are simply repeated. Unlike a switch there is no need for flow control as the total inbound and outbound cyclic packet schedule is configured by the controller to be within the bandwidth capabilities of the network.

Figure 8:
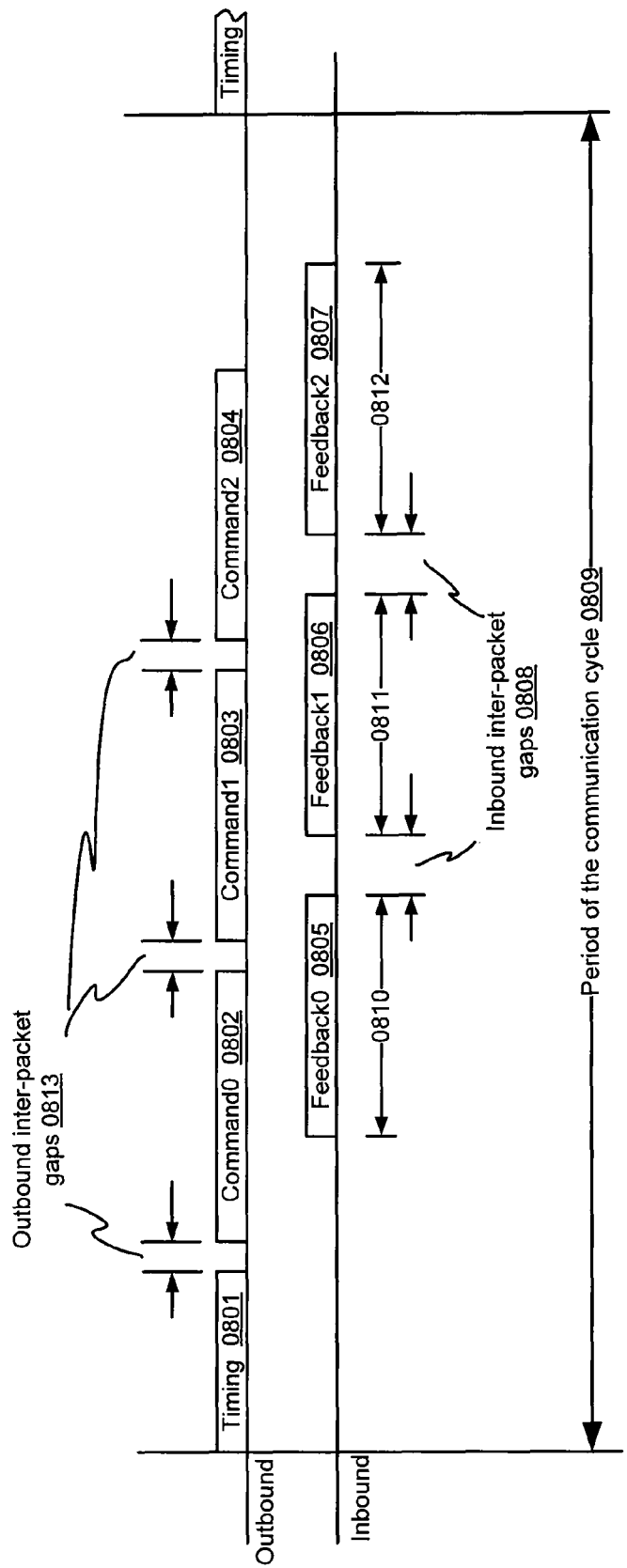
FIG. 8: Example cyclic network traffic for a full-duplex network comprising a controller and three nodes (prior art).

Modifications to the cyclic schedule—If the original inbound packet schedule of FIG. 8 is used then the forwarding buffer 0901 of each node will be empty at all times. To take advantage of the forwarding buffer it is necessary to modify the inbound packet schedule. There are two styles of inbound cyclic schedule that make use of the forwarding buffer.

Figure 10:
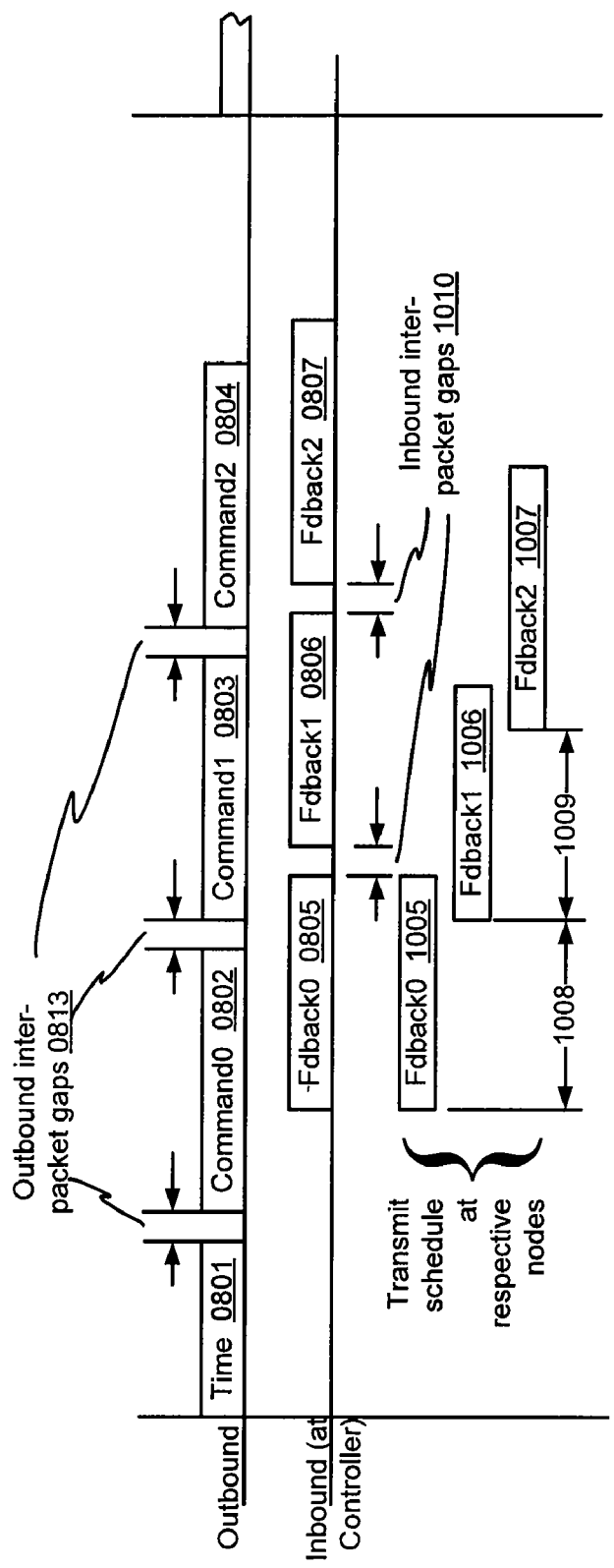
FIG. 10: Example cyclic network traffic for a full-duplex network comprising a controller and three nodes, showing a slightly overlapping inbound packet schedule.

Modified inbound packet schedule with reduced packet spacing—The first modified inbound packet schedule is to schedule the transmit durations at the nodes so that the inbound packets are closer together or even overlapping as shown in FIG. 10. The inbound (feedback) packet transmission slots 1005, 1006, 1007 now overlap in time. However the forwarding buffer in each node ensures that the inbound packets arrive at the controller as closely together as possible 1010. If the 'underlap' of transmission durations 1008, 1009 is greater than the uncertainty of the reconstructed timer in each node then the inbound packets 0805, 0806 and 0807 will arrive in the same order in which they were transmitted. This is an advantage because no sorting of the packets received at the controller is required to create the process image. However at high node counts then the uncertainty of the transmission time is longer than the duration of the received packets and this style of timing scheme will not return packets to the controller in a consistent sequence.

Figure 16:
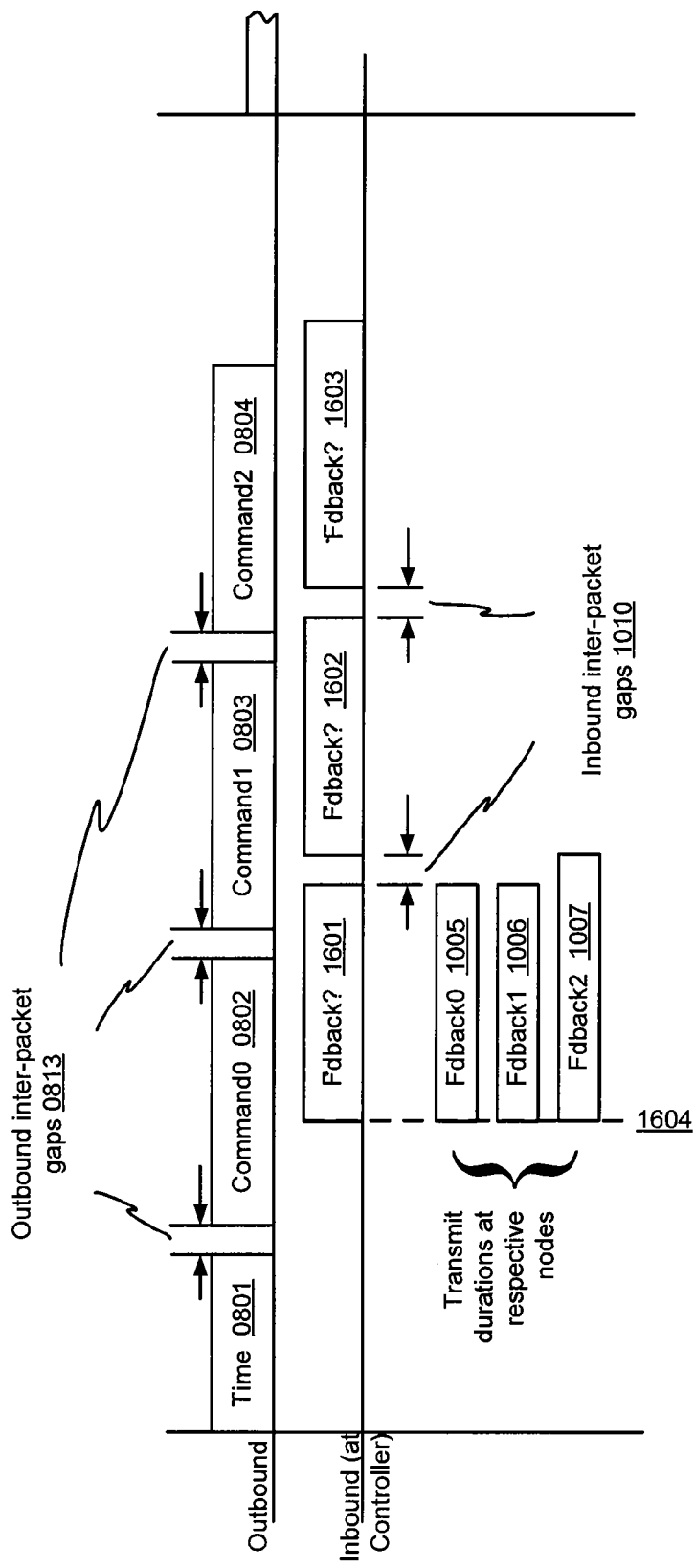
FIG. 16: Example cyclic network traffic for a full-duplex network comprising a controller and three nodes, showing a fully overlapping inbound packet schedule.

Modified inbound packet schedule with overlap—The second modified inbound packet schedule is to schedule the transmit durations at the nodes so that the inbound packets are highly overlapping and the simplest case of this is to schedule all nodes to transmit in simultaneous slots 1005, 1006, 1007 as shown in FIG. 16. The operation of the forwarding buffers ensures that the packets 1601, 1602, 1603 arrive efficiently packed on the network but in an indeterminate order; indeed the order may not even be consistent from cycle to cycle; for such systems it is necessary to sort the packets at the controller.

Sorting packets received at the controller—By adding a received packet sorter to the processor 0101 within the controller 0105 can process the data contained in inbound packets without being affected by the fact that they were received in an unpredictable order at the network logic 0102, this allows the second modified inbound packet schedule of FIG. 16 to be used without penalizing processor performance.

Figure 12:
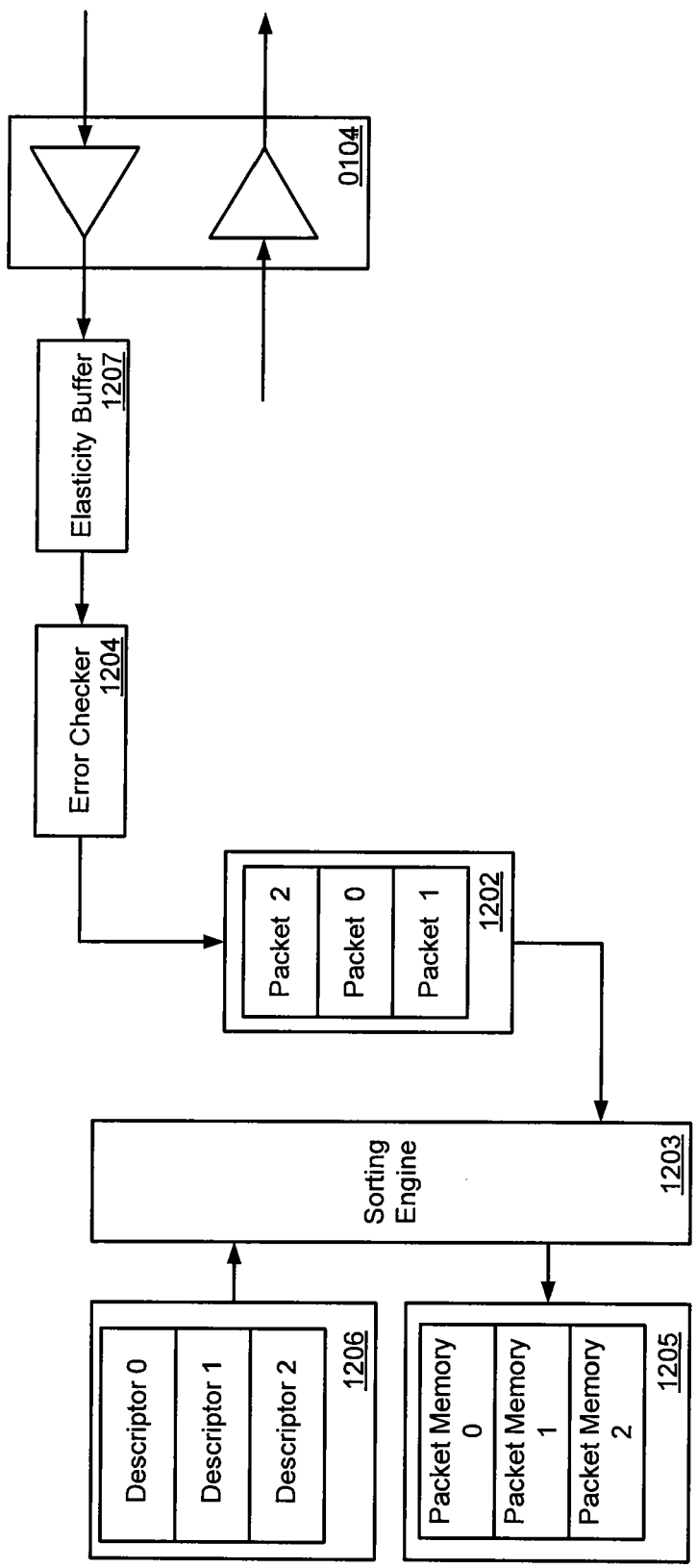
FIG. 12: A sorting engine for packets received at the controller.

A sorting engine (realized as digital logic gates and memories) can be located within the controller network logic 0102, a possible implementation is shown in FIG. 12. The packets from the nodes emerge from the elasticity buffer 1207 into an error checking circuit 1204 from which valid frames are forwarded into a FIFO 1202. The sorting engine 1203 reads the oldest packet from the FIFO 1202 and inspects the source address (which indicates which node sent the packet). An example sorting method would be to use this source address value (or other packet contents) to serve as a pointer into the descriptor table 1206 thereby allowing the descriptor entry for the respective packet to be read. When the packet descriptor has been read then the packet contents are copied from the FIFO into the sorted packet buffer memory 1205 using a starting address specified by the respective descriptor. This technique of sorting the packets as they arrive can be implemented without resort to very fast clock rates or ultra-wide data busses: if the sorting engine is able to transfer the packet data from the FIFO 1202 more quickly than the network can fill the FIFO with new packet data then the FIFO need be no longer than twice the length of the longest supported packet and the maximum delay added by the sorting process is no more than the time taken to transfer the largest packet to the sorted packet buffer memory 1205.

The preferred physical embodiment of the controller's packet sorting circuitry of FIG. 12 is to use programmable logic such as an FPGA as these devices have sufficient gate and memory resources, and may already be present in the controller to serve the network function; the incremental piece cost of implementing a hardware sorting engine is low and may even be zero.

DESCRIPTION AND OPERATION

Alternative Embodiments

Figure 17:
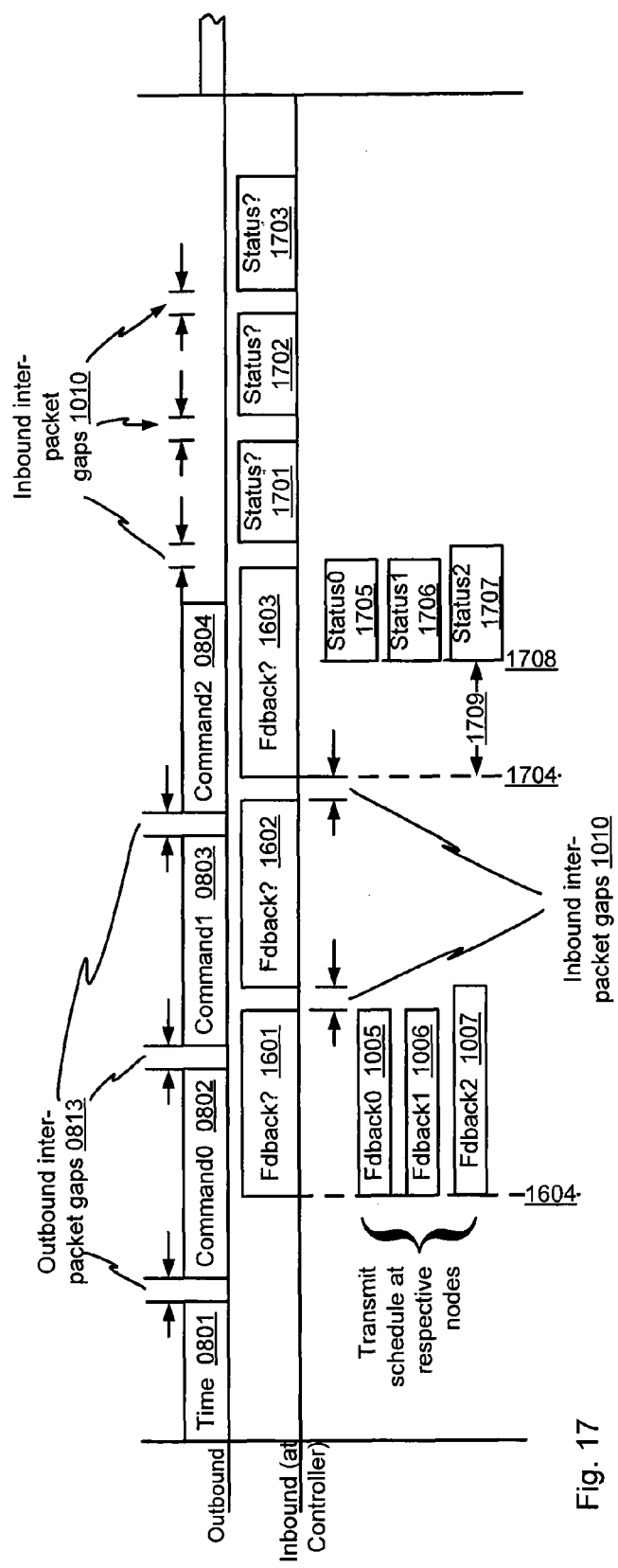
FIG. 17: Example cyclic network traffic for a full-duplex network comprising a controller and three nodes, showing inbound packets prioritized into two batches each having its own fully overlapping inbound packet schedule.

Inbound packet schedules with prioritised sets of packets—There may be more than one set of packets transmitted by the nodes, for example, as depicted in FIG. 17, time-critical, feedback data could be transmitted first and less urgent, status information could be transmitted later within the cycle (or equivalently, early in the next cycle).

In order to ensure that all of the time-critical, feedback packets arrive at the controller before the less urgent, status packets it is necessary to set the time 1708 at which the first status packet is transmitted to be at a time that is later than the time 1704 at which last feedback packet has begun to be received by the controller by a guard-band 1709 which is greater than the timer uncertainty of whichever node is scheduled to transmit its status packet first. If all of the nodes are scheduled to transmit their status packets simultaneously (as shown in FIG. 17) then the guard-band 1709 is the timer uncertainty of the farthest node from the controller (this being the worst case). The instant 1704 at which last feedback packet has begun to be received by the controller will depend upon the packet ordering if the feedback packets are not of equal length, the latest instant for 1704 occurs when the longest packets are transmitted first. Thus it will be seen that it is practicable to receive packets grouped by priority even when the ordering of the packets of within each packet group is uncontrolled. There are no hardware costs to prioritizing packets in this way.

Increased network utilisation by removing surplus idle symbols—Further increases in network efficiency in the inbound direction can be obtained by removing surplus IDLE symbols. Some idle time is required between packets in order to ensure that the descrambler circuit in the receiving PHY is correctly 'trained' i.e. kept in lock. To train the receiving PHY, the transmitting PHY must send a short sequence of IDLE symbols (e.g. eight). However the scrambler will retain lock for >500 µs and therefore only a minimal set of IDLE symbols (e.g. two) between packets is required until a watchdog function detects that 500 µs have elapsed and therefore that a longer sequence of IDLEs is required. This technique is straightforward to implement using a digital timer circuit and requires few logic gates. In a 250 node network this technique has the advantage of saving approximately 250*(8−2)*40 ns=60 µs per network cycle of otherwise dead time.

Implementing topologies more complex than the line topology

Figure 5:
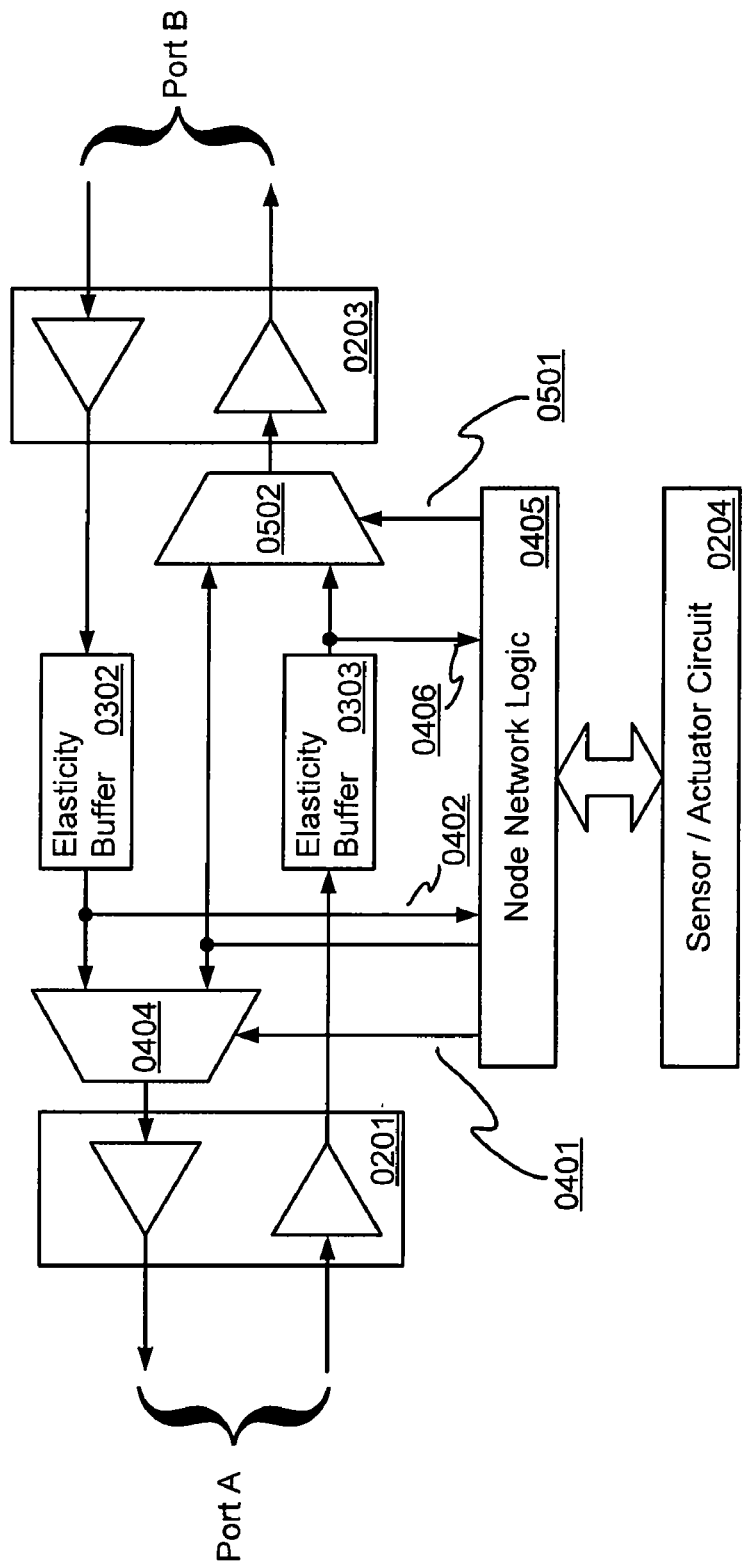
FIG. 5: A two-port node with integral repeaters and the capability to transmit inbound packets via Port A or Port B (prior art).
Figure 6:
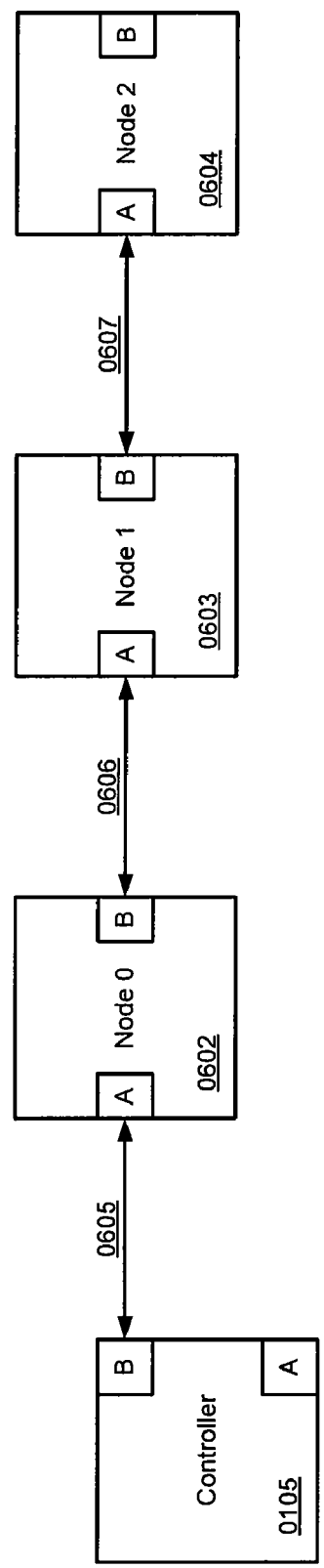
FIG. 6: A network comprising a controller and three nodes connected in a line (prior art).
Figure 7:
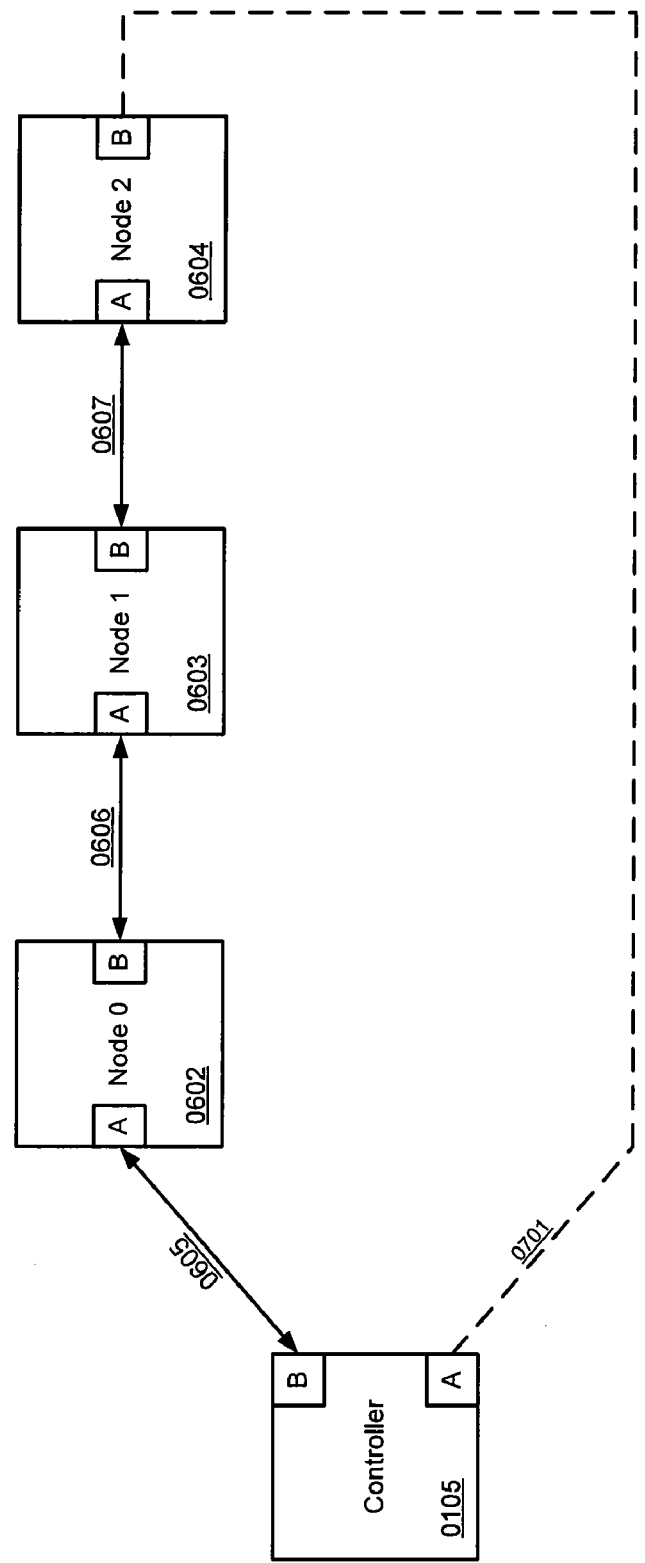
FIG. 7: A network comprising a controller and three nodes connected in a ring (prior art).

Ring—It is desirable to support other topologies, the ring connection topology in particular offers the advantage of recovery from a fault condition. The basic circuit of FIG. 4 can only send packets via the upstream PHY 0201, this is sufficient for nodes connected in the line topology of FIG. 6. However to operate in a ring topology with ring recovery capability the circuit of FIG. 4 must be extended to be able to transmit through either port as illustrated in FIG. 5. The reason for the modification is that, during ring-recovery, Port A may no longer be the upstream port and the node may have to send packets through Port B which becomes the upstream port (i.e. the functions of the two ports swap). Here a second multiplexer 0502 allows transmission via the Port B PHY 0203. The node network logic can receive packets from either PHY 0201 or PHY 0203. When both signals XMIT_A (0401) and XMIT_B (0501) are FALSE then the circuit operates as a repeater. The prior art circuit of FIG. 5 supports ring recovery but does not support OIT.

To support both ring recovery and OIT the circuits of FIG. 5 and FIG. 9 can be elaborated with a second forwarding buffer 1102 to create the circuit of FIG. 11. It will be seen that just as FIG. 5 is a version of FIG. 4 with symmetric capabilities, thus FIG. 11 is a version of FIG. 9 with symmetric capabilities. It is important to note however that although FIG. 11 has a symmetric structure, only that forwarding buffer receiving packets from whichever port serves as the downstream port is used to hold an incoming packet during the time that a locally originated packet is transmitted from the node network logic 0405; namely if Port A is the upstream port then the contents of forwarding buffer 0901 may grow whereas the contents of forwarding buffer 1102 is always empty because the node does not transmit the locally originated packet from the downstream port (Port B in this case) and signals HOLD_B 1105 and XMIT_B 0501 are FALSE. Similarly if Port B is the upstream port then the contents of forwarding buffer 1102 may grow whereas the contents of forwarding buffer 0901 is always empty because the node does not transmit the locally originated packet from the downstream port (Port A in this case) and signals HOLD_A 0904 and XMIT_A 0401 are FALSE. Thus regardless of which port is the upstream port, neither the timing nor the spacing of the downstream packets is affected as the forwarding buffer is empty.

As one of the forwarding buffers 0901 and 1102 is always empty a useful variation on the circuit of FIG. 11 would be to use a single forwarding buffer which is dynamically switched (during enumeration and during the ring recovery process) to accept packets from the newly re-assigned downstream port. Not only would this potentially conserve silicon resources but it would have the further benefit that any packet or packets that are held in the buffer during switchover could be transmitted through the re-assigned upstream port.

Again note that the forwarding buffer is active for inbound packets only. This is an asymmetric arrangement unlike a repeater, a hub or switch. Unlike a hub an OIT node such as FIG. 11 can be used in a ring topology with ring-recovery.

Figure 15:
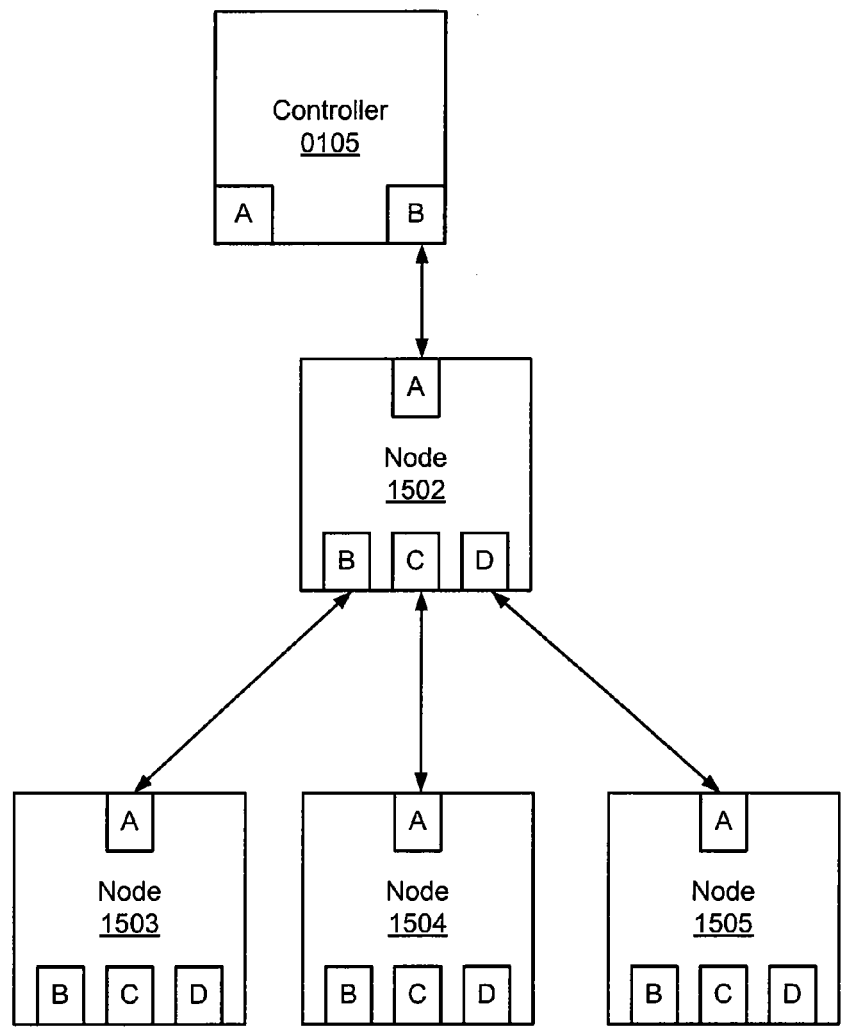
FIG. 15: A network with a tree topology (prior art).
Figure 19:
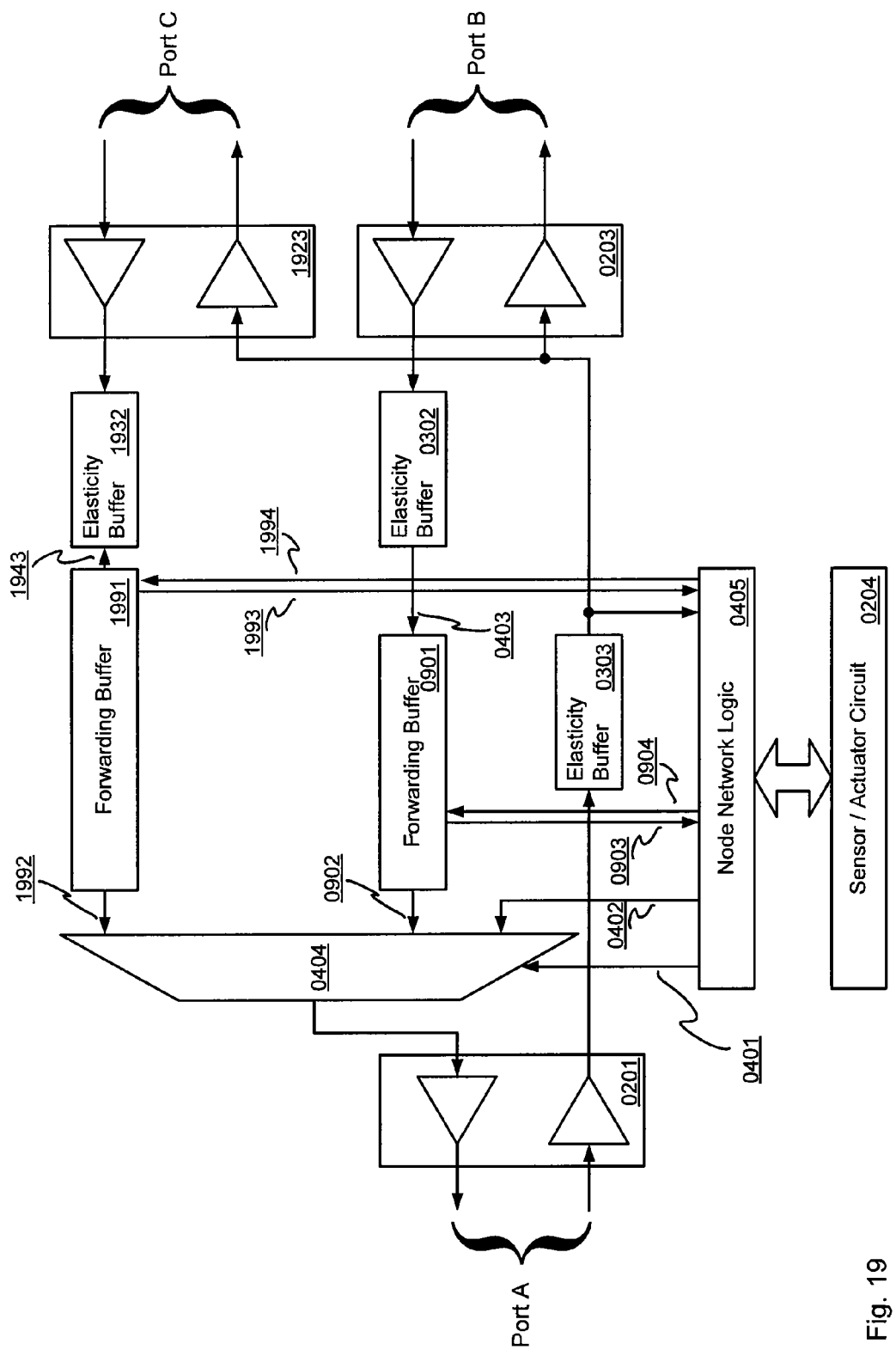
FIG. 19: A three-port, asymmetric node with integral repeaters, the capability to transmit inbound packets via Port A only and a forwarding buffer from each of Ports B and C that can be used to build line or tree topologies.

Tree—To permit the use of tree type topologies such as that of FIG. 15, the circuit of FIG. 9 can be elaborated to support multiple downstream ports, an example node with two downstream ports and one upstream port is depicted in FIG. 19. Operation of FIG. 19 is as follows: all packets received by the PHY 0201 on port A (which is always the upstream port) are repeated unconditionally by the PHYs 0203 and 1923 of the downstream ports B and C and thus reach all of the downstream nodes, a packet received by the PHY on port B 0203 first passes through the respective elasticity buffer 0302 and then into the respective forwarding buffer 0901 where the packet either accumulates in the said forwarding buffer 0901 or is gated through the multiplexer 0904 for re-transmission through the upstream port's PHY 0201, similarly a packet received by the PHY on port C 1923 first passes through the respective elasticity buffer 1932 and then into the respective forwarding buffer 1991 where the packet either accumulates in said forwarding buffer 1991 or is gated through the multiplexer 0404 for re-transmission through the upstream port's PHY 0201. In a like fashion to the circuit of FIG. 9 each forwarding buffer 0901 and 1991 has respective status indication signals 0903 and 1993 to indicate when the end of a packet has just been transmitted and respective control signals 0904 and 1994 to cause the incoming packet to be accumulated rather than transmitted, control signals 0401 select whether the locally originated packet 0402 or the outputs of the forwarding buffers 1992 or 0902 are gated through to the upstream port's PHY 0201.

The arbitration algorithm implemented in the node network logic 0405 is an elaboration of that for FIG. 9 as there are now three signal sources 0402, 0902 and 1992. The preferred scheme is for the signals 0902 and 1992 to be alternately gated through the multiplexer, thus when the end of a packet has been reached in one of the forwarding buffers, say 1991 in this case, as signaled by its respective ready signal 1993 becoming TRUE then that buffer 1991 is caused to accumulate packets from Port C by setting its hold signal 1994 to TRUE and the output 0902 of other buffer 0901 is gated through the multiplexer by signal 0401 and the packet is caused to be transmitted from buffer 0901 by setting the signal 0904 to FALSE. When a local packet 0402 is ready for transmission then both forwarding buffers 0901 and 1991 are set to accumulate their incoming packets by setting their respective hold signals 0904 and 1994 to TRUE as soon as whichever buffer was transmitting has reached the end of its current packet as indicating by both ready signals 0903 and 1993 being TRUE, at which time the local packet 0402 is sent. This arbitration scheme can be summarized as "transmit the local packet as soon as possible, otherwise transmit the packets received from the downstream ports alternately". As in the preferred embodiment, additional IDLE symbols can be inserted between packets transmitted via the upstream port's PHY 0201 by delaying the transmission of the subsequent packet. Both the circuit of FIG. 21 and the arbitration scheme can be extended to have any number of downstream ports.

Using a secondary buffer for tree topologies—In two-port nodes such as that of FIG. 9 the total upstream network capacity is equal to that of the total downstream network capacity and therefore the forwarding buffer is only required to accumulate the packet coming in from the downstream port for the duration of the transmission of the local packet. For industrial networks using the 100BASE-T physical layer, locally originated packets have a typical payload of less than 2 k bytes and therefore the forwarding buffer 0901 of FIG. 9 need be no larger than 2 k bytes.

Larger forwarding buffers are needed in FIG. 19 than for the single forwarding buffer in FIG. 9 (or its symmetrical variant FIG. 11). In FIG. 19 the packets received on two downstream ports are to be re-transmitted through one upstream port: as an example, if the network cycle time is 1 ms and the 100BASE-T physical layer is used, then each forwarding buffer could potentially hold half a cycle's worth of data (approximately 50 k bytes). Note that 2 k bytes of buffering is within the capacity of today's FPGA block memories or within the capacity of structured ASICs, whereas 50 k bytes of buffering is more economically implemented using an external memory chip.

Figure 21:
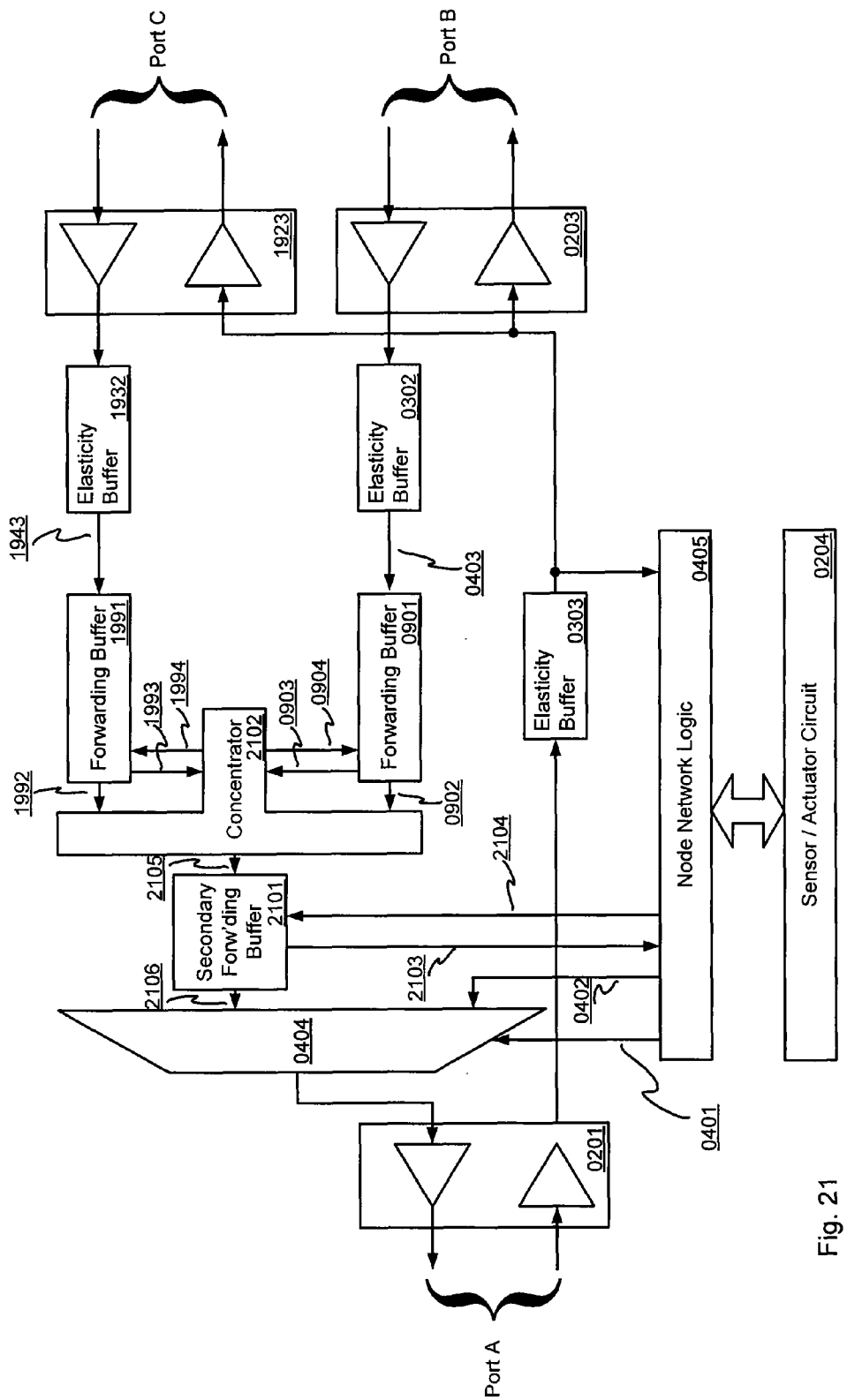
FIG. 21: A three-port, asymmetric node with integral repeaters, the capability to transmit inbound packets via Port A only, incorporating a two-stage forwarding buffer scheme from each of Ports B and C.

FIG. 19 can be modified to use two stages of forwarding buffer as shown in FIG. 21 without changing its essential operation or performance. The primary forwarding buffers 0901 and 1991 are sized to be large enough to hold any network packet, e.g. 2 k bytes. The concentrator circuit 2102 forwards packets to the secondary forwarding buffer 2101 from the each of the primary forwarding buffers 0901 and 1991 in turn. The secondary forwarding buffer 2101 has a capacity sufficient for half a cycle of network traffic, e.g. 50 k bytes, and can be economically located in an external memory device. Note that the signals 0902, 1992, 2105 carrying the packets to and from the concentrator should be capable of operating at twice the rate of the network itself in order to ensure that the primary forwarding buffers 0901 and 1991 are emptied quickly enough.

The node network logic 0405 in FIG. 21 arbitrates between the locally originated packet 0402 and the packets 2106 from the secondary forwarding buffer 2101 in exactly the same manner as it manages the forwarding buffer 0901 in FIG. 9.

The concentrator circuit 2102 activates the control signals 0904 and 1994 in response to the status signals 0903 1993 of the respective primary forwarding buffers 0901 and 1991. When the primary forwarding buffers 0901 and 1901 are empty then the concentrator circuit 2102 is idle and no symbols are forwarded to the secondary buffer 2101. When one of the primary forwarding buffers (say 0901) starts to be filled by an incoming packet from Port B, then the concentrator circuit 2102 forwards symbols from buffer 0901 to the secondary buffer 2101, this action takes place at the network rate data rate. Meanwhile the other primary forwarding buffer 1991 starts to fill from Port C. When the end of the packet has been forwarded from 0901 to 2101, buffer 0901 is empty, and the concentrator 2102 then ceases to forward symbols from 0901 and allows buffer 0901 to fill. The concentrator 2102 then operates on primary forwarding buffer 1991; if forwards the symbols from buffer 1991 to the secondary buffer 2101, this time at twice the network rate (or faster) until either it encounters the end of the packet (at which point the concentrator reverts to operating on primary buffer 0901) or it detects that buffer 1991 has been emptied at which point it continues to forward symbols (but at the network rate) until the end of the packet is encountered. By alternating between the primary forwarding buffers 0901 and 1991, the concentrator 2102 loads complete packets from the Ports B and C with minimal additional forwarding delay (less than 10 clock cycles in an efficient design).

Ring-of-rings and ring-of-trees—OIT can be deployed to complex topologies such as a ring-of-rings (see FIG. 18) or a ring of trees (a simpler case than ring-of-rings).

To support ring-of-rings, a four-port node can be devised (by an elaboration of FIG. 11 and FIG. 19) which can be configured during enumeration or dynamically during fault recovery steer traffic as follows:—

Figure 18:
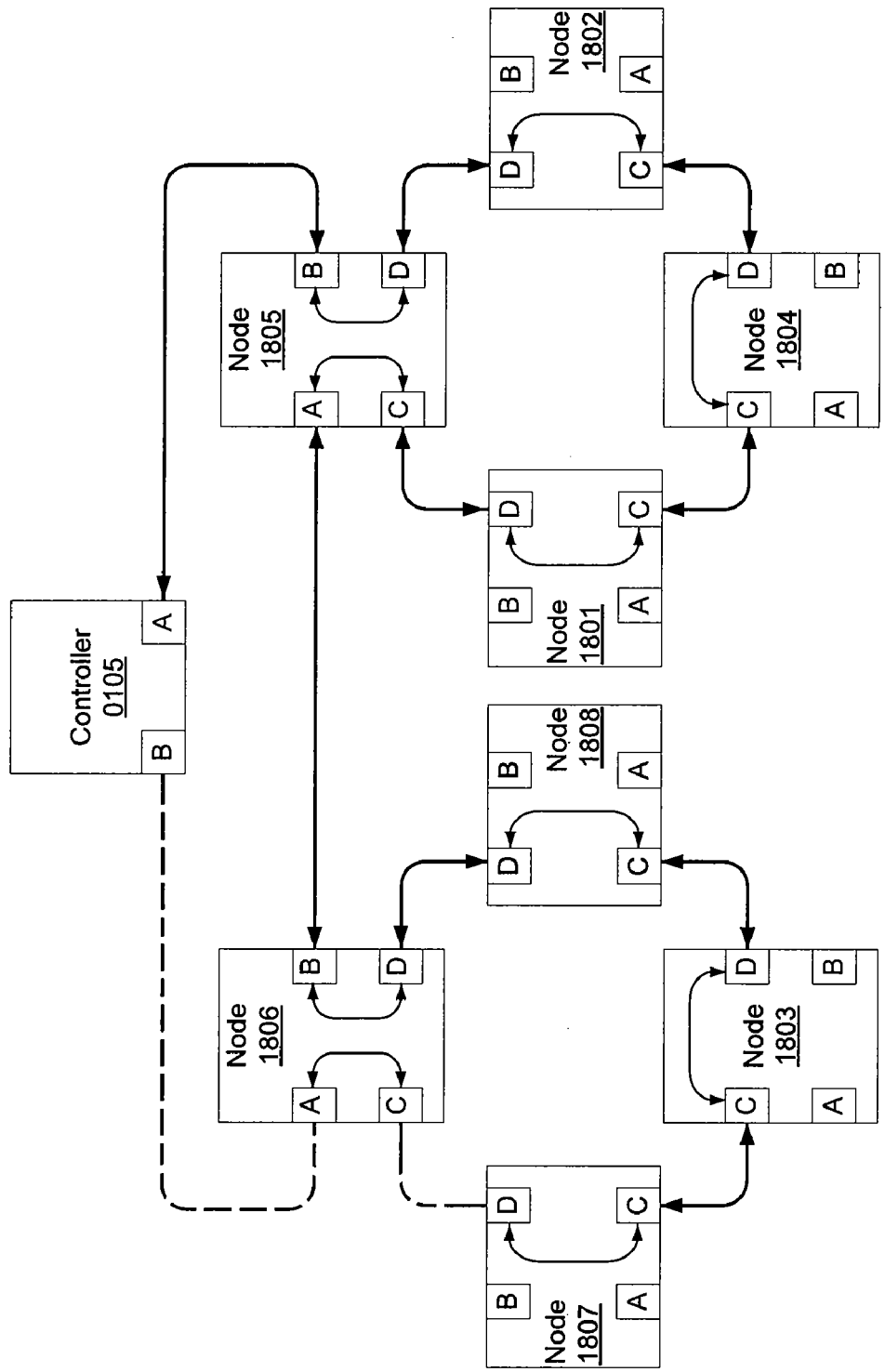
FIG. 18: A network with a physical ring-of-rings topology showing the nodes' internal data paths that create a logical ring.

- as a symmetric repeater and forwarding buffer between any two ports or
- as two pairs of symmetric repeater and forwarding buffers between any two pairs of ports or
- as a node with any port acting as the one upstream port and others acting as three downstream ports Ring-of-ring operation can then be implemented as a physical ring-of-rings but as a single logical ring, this can be explained with reference to FIG. 18; the downstream packets exit port A of the controller 0105 and enter port B of node 1805. Nodes 1805 and 1806 are configured to have two independent repeater paths (in effect two independent circuits like FIG. 11 but without duplication of the sensor actuator circuit 0204) so that packets are routed between ports B and D and between ports A and C. In FIG. 18 the path for repeating packets is indicated by the lines with arrows shown within each node. The remaining nodes (1802, 1804, 1801, 1808, 1803 and 1807) are configured to have one operational circuit like FIG. 11 that repeats between ports C and D in each case. Outbound packets are forwarded via nodes 1805 (internally repeated from port B to port D) 1802, 1804, 1801, 1805 (internally repeated from port C to port A), 1806 (internally repeated from port B to port D), 1808, 1803, 1807 and 1806 (internally repeated from port C to port A) before returning to port B of the controller 0105. Outbound packets are simply repeated through each node to the downstream ports. Inbound packets from say node 1807 pass through nodes 1803, 1808, 1806 (internally repeated from port D to port B), 1805 (internally repeated from port A to port C) 1801, 1804, 1802, 1805 (internally repeated from port D to port B) before reaching port A of the controller 0105. Inbound packets can be delayed by the forwarding buffer in any node. Packet scheduling considerations are the same as for the line or tree topologies.

Figure 20:
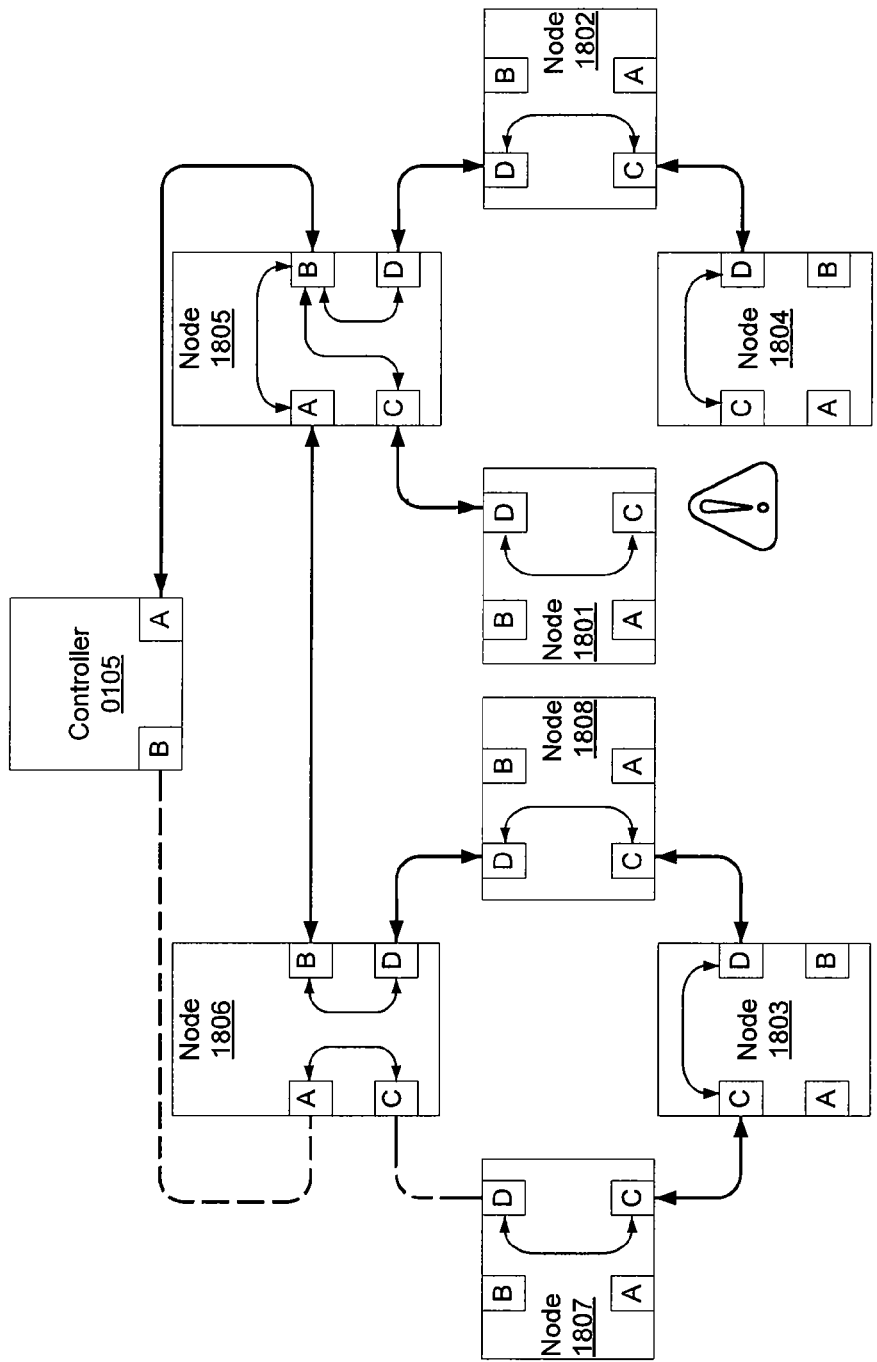
FIG. 20: A network with a ring of rings topology that has decayed to a ring with an attached tree owing to a fault between nodes 1801 and 1804.

In the event that a fault occurs in a ring-of-rings the topology decays to a simpler topology lacking redundant paths. For example in FIG. 20 the link between nodes 1801 and 1804 has failed. In FIG. 20 the path for repeating packets is indicated by the lines with arrows shown within each node. In order to maintain operation of all nodes, node 1805 re-configures itself so that nodes 1805, 1806, 1808, 1803, 1807 and 1806 (again) remain connected to the controller as a logical ring whereas 1801 and [1802, 1804] form a tree rooted at node 1805. Port B is the upstream port of node 1805, the internal network operation of node 1805 is like FIG. 9 for the ring (except that ports B and A of 1805 operate in a like fashion to ports A and B respectively of FIG. 9) and the internal network operation of node 1805 is like FIG. 19 for the tree (except that ports B, C and D of 1805 operate in a like fashion to ports A, B and C respectively of FIG. 9). Other aspects of ring-recovery, including correct reconstruction of the reconstructed timer in each node, have been taught elsewhere.

CONCLUSION, RAMIFICATIONS AND SCOPE

OIT brings increased inbound network efficiency, an increase in the number of nodes that can be connected for a given cyclic rate, a reduction in inbound latency and additional robustness to the operation of cyclic real-time networks. OIT brings a new flexibility to the scheduling of inbound packets and allows, for example, the packets to vary in length from cycle to cycle. The incremental cost of implementing OIT in the nodes is small and will in many cases be zero if spare programmable logic resources are available. The incremental cost of implementing the controller's OIT packet sorter is low and in many cases will be zero if spare programmable logic resources are available. The piece cost of modifying the inbound packet schedule to implement OIT is zero.

OIT has the further advantage that the inbound packet size from a given node can vary from communication cycle to communication cycle without having to allocate a time-slot equal the maximum expected packet size from that node; the only restriction is that the sum of the inbound packets from all nodes per cycle must fit into the total time available for sending packets inbound. This dynamic packet sizing can be of considerable practical benefit, for example when sending a large binary image inbound from a node.

The essential operation of OIT does not depend on the topology; it is equally applicable to simple topologies such as a line and to more complex topologies such as a ring, a tree, a ring-of-rings or a ring-of-trees. OIT confers additional robustness in the event of dynamic change to topology because consequential transient disruption to the reconstructed timer in each node cannot cause inbound packets to collide.

OIT does not depend upon a particular physical layer, because in addition to the 100BASE-T physical layer other physical layers with point-to-point links could be alternatively be used (for example, 1000BASE-T or RS-422 or 100BASE-FX).

OIT does not depend upon a particular protocol, in addition to SynqNet it could be applied to other cyclic, real-time protocols.

In FIGS. 9, 11, and 19 the forwarding buffer (0901, 1991) is shown as being distinct from the elasticity buffer (0302, 1932). However in many cases it will be possible to combine each forwarding buffer with its respective elasticity buffer, thereby saving cost.

The arbitration scheme of the preferred and alternative embodiments, "transmit the local packet as soon as possible, otherwise transmit the packets received from the downstream port (or ports alternately)", is clearly not the only possibility; there are other possible schemes such as enforcing the priority of the local packet by transmitting it within a certain time-frame even if this means interrupting a packet received from a downstream port.

The concentrator 2101 could enforce a maximum packet size to ensure that none of the primary buffers 0901, 1991 can overflow. The concentrator 2101 operation as described in the alternative embodiment forwards one packet from one primary forwarding buffer and then forwards a packet from the other primary forwarding buffer; it could alternatively empty each primary forwarding buffer in turn. The general principles of using a secondary forwarding buffer apply to a node with more than two downstream ports. In a node with N downstream ports, the concentrator would need to be able to empty the primary buffers at no less than N times the network rate.

The node circuitry could be embodied in ASICs if production volumes are sufficient or in order to ensure continuity of supply as an alternative to programmable logic.

As an alternative to removing surplus IDLE symbols, further increases in network efficiency in the inbound direction can be obtained by aggregating (joining together) the upstream packets on-the-fly as they arrive at each node. This saves eight data symbols for the CRC, two end-of-stream symbols plus, for example, eight inter-packet IDLE symbols. Some means of detecting packet boundaries is required so that the packet sorter at the controller can operate, an example would be to add a length field of 4 data symbols. In a 250 node network the net saving through aggregation would be approximately 250*(8+2+8−4)*40 ns=140 µs as per network cycle of otherwise dead time.

Although in most cases networks with OIT will have a single controller and multiple nodes, where the controller is the only device to send outbound packets as described above, this is not an essential feature of OIT. The network could have a second device (or devices), such as a second controller, that sends outbound packets, such a device would have to transmit during dead time in the outbound schedule of packets transmitted by the first controller, this second device would support OIT for inbound packets using a circuit such as that of FIG. 9.

There are numerous variations and improvements on the packet sorting engine of FIG. 12, for example the input could be supplied from more than one port as would be the case for ring operation. The sorting process could be accelerated using a 'cut-through' technique which inspects the source address of the packet on-the-fly.

The hardware inbound packet sorter at the controller is the fastest and may be the cheapest embodiment of an inbound packet sorter but if surplus processing power is available at controller then the inbound packet sorting function can be carried out in software. Another second possibility is to locate a processor within the controller network logic 0102 itself, this is feasible but in most cases this would not be as gate-efficient as a dedicated sorting engine.

U.S. provisional application 60/916,694, now utility application Ser. No. 12/114,873, incorporated herein by reference, teaches how to attach and enumerate a node to a cyclic real-time network, when that network is communicating cyclically, by means of re-using the pre-assigned time-slot in the inbound packet schedule in combination with an asynchronous timer. This technique is usable in combination with OIT; indeed OIT ensures that a collision of inbound packets can never occur.

Obviously, numerous modifications and variations of the present invention are possible in light of the above teachings. It is therefore to be understood that within the scope of the appended claims, the invention may be practiced otherwise as specifically described herein.

The invention claimed is:

1. A method for improved transmission efficiency of upstream packets in cyclic networks having a controller and plurality of nodes by reducing inbound packet spacing at the controller, comprising:
scheduling upstream packet transmission slots for each node in the network with overlapping time slots so that the spacing between the packet transmission slots is removed;
for each node in the network, if there is a locally originated packet of the node to be transmitted upstream, selectively activating a forwarding buffer to receive and temporarily store a packet received from a neighboring downstream node during upstream transmission of a locally originated packet of the node;
upon completion of the upstream transmission of the locally originated packet, transmitting upstream the packet stored in the forwarding buffer; and
receiving the upstream packets at the controller with reduced packet spacing and in an order dependent upon whether a non-overlapping portion of the transmission slot is greater or less than a timing uncertainty caused by a reconstructed timer in each node.

2. The method of claim 1 wherein the non-overlapping portion of the transmission slot is greater than the timing uncertainty caused by the reconstructed timer in each node so that the inbound packets at the controller arrive in the same order in which they were transmitted.

3. The method of claim 1 wherein the non-overlapping portion of the transmission slot is less than the timing uncertainty caused by the reconstructed timer in each node so that the inbound packets arrive at the controller in an indeterminate sequence and therefore require sorting.

4. The method of claim 1 wherein the upstream packet transmission slots for each node in the network are scheduled for simultaneous transmission thereby overlapping in time.

5. The method of claim 1 further comprising sorting the inbound packets received at the controller according to the contents of packet in order to present the node data to the controller's processor in a consistent form.

6. The method of claim 5 wherein sorting comprises inspecting the source address of the packet to determine the ordering for the sorting.

7. The method of claim 1 further comprising, scheduling a set of lower priority packets of the nodes to arrive at the controller after a set of higher priority packets of the nodes by scheduling the upstream packet transmission slots for the lower priority packets to begin at a point in time after the last higher priority packet has begun to be received by the controller.

8. The method of claim 7 wherein a guard band, which is a duration of time greater than the timer uncertainty of the node scheduled to transmit its status packet first, is used to determine the point in time to begin transmission of the lower priority batch of packets.

9. The method of claim 1 further comprising each forwarding node appending a minimum sequence of IDLE symbols to every packet sent.

10. The method of claim 1 wherein the network is arranged in a line topology.

11. The method of claim 1 wherein the network is arranged in a ring topology with each node having two ports, wherein one port selectively serves as the upstream port and one port selectively serves as the downstream port.

12. The method of claim 11 wherein the forwarding buffer is utilized by the port serving as the upstream port.

13. The method of claim 11 wherein a single forwarding buffer is dynamically switched to be utilized by the port serving as the upstream port in the ring.

14. The method of claim 13 wherein each port comprises a forwarding buffer with only the forwarding buffer of the upstream port being utilized and the forwarding buffer for the downstream port remaining unutilized, depending on which port is serving as the upstream port and the downstream port in the ring.

15. The method of claim 1 wherein the network is arranged in a tree topology with each node having a plurality of downstream ports and wherein each downstream port has a respective forwarding buffer.

16. The method of claim 15 further comprising, prior to transmitting upstream the packet received from the neighboring downstream node, selectively controlling with an arbitration scheme the outputs of the forwarding buffers for re-transmission through the upstream port.

17. The method of claim 16 wherein the arbitration scheme comprises alternating the outputs of the forwarding buffers.

18. A method for improved transmission efficiency of upstream packets in cyclic networks having a controller and plurality of nodes in a tree topology by reducing inbound packet spacing at the controller, comprising:
scheduling upstream packet transmission slots for each node in the network with overlapping time slots so that the spacing between the packet transmission slots is removed;
for each node in the network having a plurality of downstream ports, providing each downstream port with a respective forwarding buffer, and selectively activating the forwarding buffer to receive and temporarily store a packet received from a neighboring downstream node;
transmitting packets stored in each downstream port's respective forwarding buffer to a secondary forwarding buffer;
upon completion of the upstream transmission of a locally originated packet, outputting the packets stored in the secondary forwarding buffer for re-transmission through the upstream port; and
receiving the upstream packets at the controller with reduced packet spacing and in an order dependent upon whether a non-overlapping portion of the transmission slot is greater or less than a timing uncertainty caused by a reconstructed timer in each node.

19. The method of claim 18 wherein the secondary forwarding buffer has a capacity for at least half a cycle of network traffic.

20. The method of claim 18 wherein the secondary forwarding buffer is located in an external memory device.

21. The method of claim 1 wherein a topology of the network comprises a ring of rings.

22. The method of claim 1 wherein a topology of the network comprises a ring of trees.

23. The method of claim 1 wherein the node's forwarding buffer is combined with the node's elasticity buffer.

24. A cyclic network allowing for improved transmission efficiency of upstream packets by reducing inbound packet spacing at a controller for the network comprising:
a plurality of nodes on the network arranged in a line topology, each node communicating with each other, wherein each node comprises a forwarding buffer;
a network controller for scheduling upstream packet transmission slots for each node in the network to be overlapping in time without inter-packet gaps so that the spacing between the packet transmission slots is removed;
node network logic for each node in the network, configured such that if there is a locally originated packet of the node to be transmitted upstream, selectively activating the forwarding buffer to receive and temporarily store a packet received from a neighboring downstream node during upstream transmission of a locally originated packet of the node; and upon completion of the upstream transmission of the locally originated packet, transmitting upstream the packet stored in the forwarding buffer; and
receiving the upstream packets at the controller with reduced packet spacing and in an order dependent upon whether a non-overlapping portion of the transmission slot is greater or less than a timing uncertainty caused by a reconstructed timer in each node.

25. The cyclic network of claim 24 wherein the upstream packet transmission slots overlap in time such that the inbound packets arrive at the controller in an indeterminate sequence and therefore require sorting.

26. The cyclic network of claim 25 further comprising a sorting engine for sorting inbound packets received at the controller.

27. A cyclic network allowing for improved transmission efficiency of upstream packets by reducing inbound packet spacing at a controller for the network comprising:
a plurality of nodes on the network arranged in a ring topology, each node communicating with each other and having two ports, wherein one port selectively serves as the upstream port and one port selectively serves as the downstream port, wherein each node further comprises a forwarding buffer;
a network controller for scheduling upstream packet transmission slots for each node in the network to be overlapping in time without inter-packet gaps so that the spacing between the packet transmission slots is removed;
node network logic for each node in the network, configured such that if there is a locally originated packet of the node to be transmitted upstream, selectively activating the forwarding buffer utilized by the port serving as the upstream port to receive and temporarily store a packet received from a neighboring downstream node during upstream transmission of a locally originated packet of the node; and upon completion of the upstream transmission of the locally originated packet, transmitting upstream the packet stored in the forwarding buffer;
wherein the upstream packets are received at the controller with reduced packet spacing and in an order dependent upon whether a non-overlapping portion of the transmission slot is greater or less than a timing uncertainty caused by a reconstructed timer in each node.

28. The cyclic network of claim 27 wherein a single forwarding buffer is dynamically switched to be utilized by the port serving as the upstream port in the ring.

29. The cyclic network of claim 27 wherein each port comprises a forwarding buffer with only the forwarding buffer of the upstream port being utilized and the forwarding buffer for the downstream port remaining unutilized, depending on which port is serving as the upstream port and the downstream port in the ring.

30. The cyclic network of claim 27 wherein the upstream packet transmission slots overlap in time such that the inbound packets arrive at the controller in an indeterminate sequence and therefore require sorting.

31. The cyclic network of claim 30 further comprising a sorting engine for sorting inbound packets received at the controller.

32. A cyclic network allowing for improved transmission efficiency of upstream packets by reducing inbound packet spacing at a controller for the network comprising:
  a plurality of nodes on the network arranged in a tree topology, each node communicating with each other, wherein each node having a plurality of downstream ports and wherein each downstream port has a respective forwarding buffer;
  a network controller for scheduling upstream packet transmission slots for each node in the network to be overlapping in time without inter-packet gaps so that the spacing between the packet transmission slots is removed;
  node network logic for each node in the network, configured such that if there is a locally originated packet of the node to be transmitted upstream, selectively activating the forwarding buffers for each downstream port to receive and temporarily store a packet received from its respective neighboring downstream node during upstream transmission of a locally originated packet of the node; and upon completion of the upstream transmission of the locally originated packet, selectively controlling with an arbitration scheme the outputs of the forwarding buffers for re-transmission through the upstream port;
  wherein the upstream packets are received at the controller with reduced packet spacing and in an order dependent upon whether a non-overlapping portion of the transmission slot is greater or less than a timing uncertainty caused by a reconstructed timer in each node.

33. The cyclic network of claim 32 wherein the arbitration scheme comprises alternating the outputs of the forwarding buffers.

34. The cyclic network of claim 32 wherein the upstream packet transmission slots overlap in time such that the inbound packets arrive at the controller in an indeterminate sequence and therefore require sorting.

35. The cyclic network of claim 34 further comprising a sorting engine for sorting inbound packets received at the controller.

36. A cyclic network allowing for improved transmission efficiency of upstream packets by reducing inbound packet spacing at a controller for the network comprising:
  a plurality of nodes on the network arranged in a tree topology, each node communicating with each other, wherein each node having a plurality of downstream ports and wherein each downstream port has a respective forwarding buffer;
  a secondary forwarding buffer to which each downstream port's respective forwarding buffer is connected;
  a network controller for scheduling upstream packet transmission slots for each node in the network to be overlapping in time without inter-packet gaps so that the spacing between the packet transmission slots is removed;
  node network logic for each node in the network, configured to selectively activate the forwarding buffers for each downstream port to receive and temporarily store a packet received from its respective neighboring downstream node and transmit the stored packets to the secondary forwarding buffer during upstream transmission of a locally originated packet of the node; and upon completion of the upstream transmission of a locally originated packet, outputting the packets stored in the secondary forwarding buffer for re-transmission through the upstream port;
  wherein the upstream packets are received at the controller with reduced packet spacing and in an order dependent upon whether a non-overlapping portion of the transmission slot is greater or less than a timing uncertainty caused by a reconstructed timer in each node.

37. The cyclic network of claim 36 wherein the secondary forwarding buffer has a capacity for at least half a cycle of network traffic.

38. The cyclic network of claim 36 wherein the secondary forwarding buffer is located in an external memory device.

39. The cyclic network of claim 36 wherein the upstream packet transmission slots overlap in time such that the inbound packets arrive at the controller in an indeterminate sequence and therefore require sorting.

40. The cyclic network of claim 39 further comprising a sorting engine for sorting inbound packets received at the controller.

41. The method of claim 9 further comprising each forwarding node appending sufficient IDLE symbols to every packet sent to accommodate variations in node clock frequencies and periodically appending additional IDLE symbols to maintain scrambler lock at the upstream network device.

42. The method of claim 7 further comprising, wherein there are more than two prioritized batches packets.

43. The method of claim 1 further comprising sorting the inbound packets received at the controller according to the source address of packet in order to present the node data to the controller's processor in a consistent form.

* * * * *